(12) United States Patent  
Mercolino et al.

(10) Patent No.: US 9,053,364 B2  
(45) Date of Patent: Jun. 9, 2015

(54) PRODUCT, IMAGE, OR DOCUMENT AUTHENTICATION, VERIFICATION, AND ITEM IDENTIFICATION

(71) Applicant: Authentiform, LLC, Research Triangle Park, NC (US)

(72) Inventors: Thomas J. Mercolino, Research Triangle Park, NC (US); Darrell Jerome Freeman, Jr., Research Triangle Park, NC (US); Robert Brooks Stephenson, Research Triangle Park, NC (US); Hersh Ashok Tapadia, Research Triangle Park, NC (US)

(73) Assignee: Authentiform, LLC, Research Triangle Park, NC (US)

( * ) Notice: Subject to any disclaimer, the term of this patent is extended or adjusted under 35 U.S.C. 154(b) by 0 days.

(21) Appl. No.: 14/067,945

(22) Filed: Oct. 30, 2013

(65) Prior Publication Data

US 2014/0119615 A1   May 1, 2014

Related U.S. Application Data

(60) Provisional application No. 61/720,082, filed on Oct. 30, 2012, provisional application No. 61/790,829, filed on Mar. 15, 2013.

(51) Int. Cl.
*G06K 9/00* (2006.01)
*G06K 7/10* (2006.01)
(Continued)

(52) U.S. Cl.
CPC ............. *G06K 9/00536* (2013.01); *G06K 7/10* (2013.01); *G06K 9/00154* (2013.01); *G06K 7/00* (2013.01); *G06K 19/06037* (2013.01);
(Continued)

(58) Field of Classification Search
CPC ............................. G06K 7/10; G06K 9/00154
USPC .......................................... 382/112, 218, 219
See application file for complete search history.

(56) References Cited

U.S. PATENT DOCUMENTS

| 1,787,995 A | 1/1931 | Reilly |
| 3,861,886 A | 1/1975 | Meloy |

(Continued)

FOREIGN PATENT DOCUMENTS

| DE | 10345458 A1 | 10/2004 |
| EP | 0650546 B1 | 10/1997 |

(Continued)

OTHER PUBLICATIONS

Barker, Robert L., et al., "Cytometric Detection of DNA Amplified with Fluorescent Primers: Applications to Analysis of Clonal bcl-2 and IgH Gene Rearrangements in Malignant Lymphomas", Blood, 83(4):1079-1085 (Feb. 15, 1994).

(Continued)

*Primary Examiner* — Utpal Shah
(74) *Attorney, Agent, or Firm* — NKK Patent Law, PLLC

(57) ABSTRACT

The present disclosure provides methods, reagents, and apparatus for authenticating and identifying products. Methods of the disclosure are easy to implement but difficult to replicate, simulate, alter, transpose, or tamper with. In some embodiments, the present disclosure relates to a method of authenticating products using a product authentication code defined by a frequency array of a population of entities, and an item identifier defined by the specific manifestation of the product authentication code.

9 Claims, 37 Drawing Sheets

(51) Int. Cl.
*G06K 7/00* (2006.01)
*G06K 19/06* (2006.01)
*G06K 19/10* (2006.01)
*G07D 7/20* (2006.01)
*G07D 7/00* (2006.01)
*B42D 25/305* (2014.01)

(52) U.S. Cl.
CPC ............. *G06K 19/10* (2013.01); *G07D 7/2058* (2013.01); *G07D 7/004* (2013.01); *G07D 7/20* (2013.01); *G07D 7/2033* (2013.01); *B42D 25/305* (2014.10)

(56) References Cited

U.S. PATENT DOCUMENTS

| | | | |
|---|---|---|---|
| 3,983,535 A * | 9/1976 | Herbst et al. | 382/122 |
| 4,028,674 A * | 6/1977 | Chuang | 382/123 |
| 4,053,433 A | 10/1977 | Lee | |
| 4,250,382 A | 2/1981 | Libby | |
| 4,267,234 A | 5/1981 | Rembaum | |
| 4,267,235 A | 5/1981 | Rembaum et al. | |
| 4,345,604 A | 8/1982 | Renirie | |
| 4,423,819 A | 1/1984 | Cummings | |
| 4,552,812 A | 11/1985 | Margel et al. | |
| 4,640,035 A | 2/1987 | Kind et al. | |
| 4,677,138 A | 6/1987 | Margel | |
| 4,767,205 A | 8/1988 | Schwartz et al. | |
| 5,139,812 A | 8/1992 | Lebacq | |
| 5,289,547 A | 2/1994 | Ligas et al. | |
| 5,429,952 A | 7/1995 | Garner et al. | |
| 5,450,190 A | 9/1995 | Schwartz et al. | |
| 5,451,505 A | 9/1995 | Dollinger | |
| 5,599,578 A | 2/1997 | Butland | |
| 5,802,200 A * | 9/1998 | Wirtz | 382/119 |
| 5,828,772 A * | 10/1998 | Kashi et al. | 382/119 |
| 5,845,264 A | 12/1998 | Nellhaus | |
| 5,974,150 A | 10/1999 | Kaish et al. | |
| 5,992,742 A | 11/1999 | Sullivan et al. | |
| 6,035,914 A | 3/2000 | Ramsey et al. | |
| 6,071,531 A | 6/2000 | Jona et al. | |
| 6,159,504 A | 12/2000 | Kumabe | |
| 6,214,766 B1 | 4/2001 | Kurrle | |
| 6,246,061 B1 | 6/2001 | Ramsey et al. | |
| 6,309,690 B1 | 10/2001 | Brogger et al. | |
| 6,402,986 B1 | 6/2002 | Jones, II et al. | |
| 6,424,728 B1 * | 7/2002 | Ammar | 382/119 |
| 6,458,595 B1 | 10/2002 | Selinfreund | |
| 6,522,945 B2 | 2/2003 | Sleep et al. | |
| 6,586,012 B2 | 7/2003 | Yu et al. | |
| 6,587,577 B1 * | 7/2003 | Finkelstein | 382/123 |
| 6,632,526 B2 | 10/2003 | Chandler et al. | |
| 6,647,649 B2 | 11/2003 | Hunt et al. | |
| 6,649,414 B1 | 11/2003 | Chandler et al. | |
| 6,696,091 B2 | 2/2004 | Thakur et al. | |
| 6,708,618 B1 | 3/2004 | Tsai | |
| 6,714,299 B2 | 3/2004 | Peterson et al. | |
| 6,773,812 B2 | 8/2004 | Chandler et al. | |
| 6,799,725 B1 | 10/2004 | Hess et al. | |
| 6,869,015 B2 | 3/2005 | Cummings et al. | |
| 6,892,178 B1 | 5/2005 | Zacharia | |
| 6,919,009 B2 | 7/2005 | Stonas et al. | |
| 6,948,068 B2 | 9/2005 | Lawandy et al. | |
| 6,968,231 B1 | 11/2005 | Silvian et al. | |
| 7,041,362 B2 | 5/2006 | Barbera-Guillem | |
| 7,052,737 B2 | 5/2006 | Kool et al. | |
| 7,089,420 B1 | 8/2006 | Durst et al. | |
| 7,094,305 B2 | 8/2006 | Cleary | |
| 7,129,506 B2 | 10/2006 | Ross et al. | |
| 7,162,035 B1 | 1/2007 | Durst et al. | |
| 7,207,490 B2 | 4/2007 | Schneider | |
| 7,256,398 B2 | 8/2007 | Ross et al. | |
| 7,364,091 B2 | 4/2008 | Streeter | |
| 7,378,675 B2 | 5/2008 | Ross et al. | |
| 7,392,950 B2 | 7/2008 | Walmsley et al. | |
| 7,394,997 B2 | 7/2008 | Mei et al. | |
| 7,484,096 B1 * | 1/2009 | Garg et al. | 713/170 |
| 7,507,588 B2 | 3/2009 | Mehrpouyan et al. | |
| 7,720,254 B2 | 5/2010 | Stierman et al. | |
| 7,752,137 B2 | 7/2010 | Dillon | |
| 7,773,749 B1 | 8/2010 | Durst et al. | |
| 7,831,042 B2 | 11/2010 | Stierman et al. | |
| 7,874,489 B2 | 1/2011 | Mercolino | |
| 7,885,428 B2 | 2/2011 | Stierman et al. | |
| 7,995,196 B1 | 8/2011 | Fraser | |
| 2001/0037455 A1 | 11/2001 | Lawandy et al. | |
| 2002/0048822 A1 | 4/2002 | Rittenburg et al. | |
| 2002/0066543 A1 | 6/2002 | Lilly | |
| 2002/0129251 A1 | 9/2002 | Itakura et al. | |
| 2003/0064105 A1 | 4/2003 | Kim et al. | |
| 2003/0141375 A1 | 7/2003 | Lawandy | |
| 2004/0022355 A1 | 2/2004 | Kaiser et al. | |
| 2004/0061702 A1 | 4/2004 | Kincaid | |
| 2004/0126840 A1 | 7/2004 | Cheng et al. | |
| 2004/0166063 A1 | 8/2004 | Siegel | |
| 2004/0185481 A1 | 9/2004 | Numajiri | |
| 2005/0031838 A1 | 2/2005 | Lagunowich et al. | |
| 2005/0060171 A1 | 3/2005 | Molnar | |
| 2005/0100204 A1 | 5/2005 | Afzal et al. | |
| 2005/0108044 A1 | 5/2005 | Koster | |
| 2005/0112610 A1 | 5/2005 | Lee et al. | |
| 2006/0054506 A1 | 3/2006 | Natan et al. | |
| 2006/0081710 A1 | 4/2006 | Streeter | |
| 2006/0105335 A1 | 5/2006 | Daehne et al. | |
| 2006/0119913 A1 | 6/2006 | Moon | |
| 2006/0131517 A1 | 6/2006 | Ross et al. | |
| 2006/0249588 A1 | 11/2006 | Walmsley et al. | |
| 2007/0012783 A1 | 1/2007 | Mercolino | |
| 2007/0086625 A1 | 4/2007 | Polli et al. | |
| 2007/0172429 A1 | 7/2007 | Gao et al. | |
| 2007/0205258 A1 | 9/2007 | Self et al. | |
| 2008/0034426 A1 | 2/2008 | Stierman et al. | |
| 2009/0084859 A1 | 4/2009 | Lapstun et al. | |
| 2010/0128925 A1 | 5/2010 | Stierman et al. | |

FOREIGN PATENT DOCUMENTS

| | | |
|---|---|---|
| EP | 1998710 | 12/2008 |
| EP | 1999873 | 12/2008 |
| EP | 2011008 | 1/2009 |
| GB | 2220346 A | 10/1990 |
| JP | 6-298650 A | 10/1994 |
| JP | 2009041321 A | 2/2009 |
| JP | 2010122770 A | 6/2010 |
| KR | 10-2007-0044149 A | 4/2007 |
| WO | 99/17486 A1 | 4/1999 |
| WO | 0151915 A1 | 7/2001 |
| WO | 03039648 A2 | 5/2003 |
| WO | 2004/041328 A2 | 5/2004 |
| WO | 2004038645 A1 | 5/2004 |
| WO | 2004/063752 A1 | 7/2004 |
| WO | 2005/111127 A1 | 11/2005 |
| WO | 2007002009 A2 | 1/2007 |
| WO | 20070020016 A2 | 1/2007 |
| WO | 2007021971 A2 | 2/2007 |
| WO | 2007106512 A2 | 9/2007 |
| WO | 2007106514 A2 | 9/2007 |
| WO | 2007106515 A2 | 9/2007 |
| WO | 2007149127 A1 | 12/2007 |

OTHER PUBLICATIONS

Euliss, Larken E., et al, "Imparting size, shape and composition control of materials for nanomedicine", Chem. Soc. Rev. 35:1095-1104 (2006).

Finkel, Nancy H., et al., "The Barcoding Microworld", Analytical Chemistry, 353A-359A (Oct. 1, 2004).

Flurer, Cheryl L., et al., "Chemical profiling of pharmaceuticals by capillary electrophoresis in the determination of drug origin", Journal of Chromatography A 674:153-163 (1994).

Fulton, R. Jerrold, et al., "Advanced multiplexed analysis with the FlowMetrix™ system", Clinical Chemistry, 43 (9):1749-1756 (1997).

(56) References Cited

OTHER PUBLICATIONS

Fulwyler, Mack J., et al., "Flow Microsphere Immunoassay for the Quantitative and Simultaneous Detection of Multiple Soluble Analytes", Methods in Cell Biology 42:575-595 (1994).

Golub, T.R., et al., "Molecular Classification of Cancer: Class Discovery and Class Prediction by Gene Expression Monitoring", Science, Oct. 15, 1999, pp. 531-537, vol. 286, www.sciencemag.org.

Green, Michael D., et al., "Short communication: Authentication of artemether, artesunate and dihydroartemisinin antimalarial tablets using a simple colorimetric method", Tropical Medicine and International Health, 6(12):980-982 (Dec. 2001).

Ham, Martijin Ten, "Health Risks of Counterfeit Pharmaceuticals", Drug Safety, 26(14):991-997 (2003).

Han, Mingyong, et al., "Quantum-dot-tagged microbeads for multiplexed optical coding of biomolecules," Nature Biotechnology, 19:631-635 (2001).

Hobby Industry Technology Site, Manufacturers Guide to Bar Code Common Forms and EC/EDI, May 2001, pp. 1-4.

McHugh, Thomas M., "Flow Microsphere Immunoassay for the Quantitative and Simultaneous Detection of Multiple Soluble Analytes", Methods in Cell Biology, 33:613-629 (1990).

Olsen, Bernard A., et al., "Screening for Counterfeit Drugs Using Near-Infrared Spectroscopy", Pharmaceutical Technology, 62, 64, 66, 68, 70-71 and 95 (Jun. 2002).

Pachaly, Von P., et al., "Einfache dunnschichtchromatographische Identitatsprufung von Wirkstoffen in Fertigarzneimitteln" Pharm. Ind. 55(3):259-267 (1993).

Rolland, Jason P., et al., "High-Resolution Soft Lithography: Enabling Materials for Nanotechnoloies", Angew. Chem. 116:5920-5923 (2004).

Rolland, Jason P., et al., "Direct Fabrication and Harvesting of Monodisperse, Shape-Specific Nanobiomaterials", J. Am. Chem. Soc. (Mar. 28, 2005).

Scafi, Sergio Henrique Frasson, et al., "Identification of counterfeit drugs using near-infrared spectroscopy", Analyst, 126:2218-2224 (Nov. 19, 2001).

Wolfrum, C., et al., "Oligonucleotides as Coding Molecules in an Anti-Counterfeiting System, Nucleosides, Nucleotides, and Nucleic Acids", 2005, pp. 1069-1074, vol. 24 (5-7).

Yang G., et al., "Detection of hepatitis B virus in plasma using flow cytometric analyses of polymerase chain reaction-amplified DNA incorporating digoxigenin-11-dUTP", Blood, 81:1083-1088 (1993).

Zhi, Z, et al., "Multianalyte immunoassay with self-assembled addressable microparticle array on a chip", Analytical Biochemistry, 2003, pp. 236-243, vol. 318, Elsevier Science.

Co-pending U.S. Appl. No. 11/455,817 dated Jun. 20, 2006.

European Patent Office, Supplementary European Search Report for European Patent application No. 06785135.2-2210 dated Mar. 2, 2012.

Patent Cooperation Treaty, International Search Report on Patentability, Dec. 22, 2008, PCT/US2006/062374.

Patent Cooperation Treaty, Written Opinion of the International Search Authority, Jul. 31, 2007, PCT/US2006/062374.

Patent Cooperation Treaty, International Preliminary Report on Patentability, Mar. 17, 2009, PCT/US2006/023876.

Patent Cooperation Treaty, Written Opinion of the International Search Authority, Apr. 16, 2008, PCT/US2006/023876.

Patent Cooperation Treaty, International Preliminary Report on Patentability, Dec. 24, 2007, PCT/US2006/023868.

Patent Cooperation Treaty, Written Opinion of the International Search Authority, Apr. 25, 2007, PCT/US2006/023868.

Sung Chul Kang, International Search Report for corresponding PCT Application No. PCT/US2013/067633, Feb. 18, 2014, pp. 1-21, Korean Intellectual Property Office, Metropolitan City, Republic of Korea.

\* cited by examiner

FIELD

ENTITIES

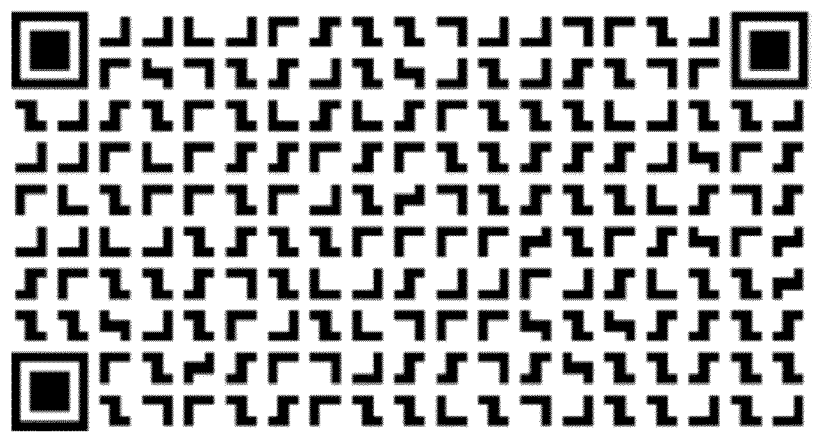
FIG. 19
FIG. 20A
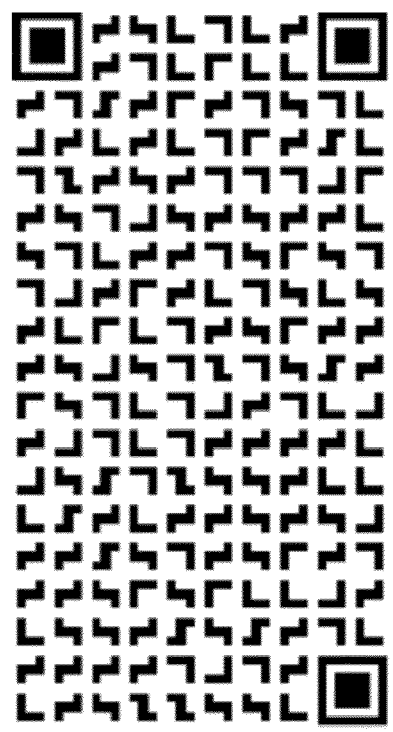
FIG. 20B

| a | b | c |
|---|---|---|
| a | b | c |
| <u>a</u> | <u>b</u> | <u>c</u> |

FIG. 23

| c | <u>b</u> | a | a |
|---|---|---|---|
| c | <u>b</u> | c | a |
| <u>a</u> | a | c | b |
| <u>c</u> | a | a | c |

PRODUCT, IMAGE, OR DOCUMENT AUTHENTICATION, VERIFICATION, AND ITEM IDENTIFICATION

CROSS-REFERENCE TO RELATED APPLICATIONS

This application claims priority to U.S. Provisional Patent Application No. 61/720,082 filed on Oct. 30, 2012, and U.S. Provisional Patent Application No. 61/790,829 filed on Mar. 15, 2013, the contents of which are hereby incorporated by reference herein.

FIELD

This disclosure is in the general field of methods and apparatus for authenticating and identifying products and the relationship of renderings of information, such as computer and cell phone display images, to the source of such information in digitally secure environments. More particularly, the disclosure relates to authentication and identification of signatures and text in documents subject to fraudulent changes thereto.

BACKGROUND

Product authentication is the manner whereby a legitimate product may be distinguished from a counterfeited fake designed to resemble the genuine article. Product authentication also plays a critical role in distinguishing diverted or "gray market" products, which are by definition legitimately manufactured products distributed into markets other than originally intended in violation of a contract, law or regulation. Closely linked to product authentication are "track and trace" of product movement in the supply chain from manufacturer to intermediary suppliers and retailers to end customers.

Authentication methods are also widely used as manner for providing secure access to sensitive areas or information, for example, using passwords, biometrics, or public-private key methods.

Further, product identification at the item level is desirable in cases where an individual instance of like products must be distinguished from all other instances of that product. A person's signature affixed to a document, whether done so manually or through digital processes, falls into this latter category.

Also useful is the authentication and identification of text in documents subject to changes. In general, any document of value is subject to changes for fraudulent purposes. Examples include prescriptions for controlled substances like narcotic analgesics, medical records, supply chain documents like customs forms and manifests, and academic records like transcripts, letters of recommendation, and diplomas.

SUMMARY

The present invention provides methods, systems and apparatus for authenticating or verifying products, images, or documents (collectively referred to as a "product") and/or identifying individual instances of the same. More specifically, specific or individual instances of the product may be identified via the product's packaging. Alternatively, the product may be an individual's signature, whether said signature is manually, machine, or software generated. The product also may be documents like prescriptions for medications, medical records, supply chain documents like customs forms and manifests, and academic records like transcripts, letters of recommendation, and diplomas in print or in fixed digital form such as an ADOBE ACROBAT PDF format. The product may be an image rendered digitally, such as on a computer or cell phone display screen. Methods of the invention are easy to implement and can be covert, but are difficult to replicate, simulate, alter, or transpose, and resist tampering and inadvertent or intentional alteration.

A method of authenticating and identifying a product is provided. The method includes receiving an image that includes a product authentication identifier; identifying the product authentication identifier, wherein the product authentication identifier includes one or more reference characters; providing the one or more reference characters on a predetermined arrangement map; comparing the predetermined arrangement map with an arrangement map that matches a true authentication identifier; and determining whether the image has been altered based on the comparison of the predetermined arrangement map with the true authentication identifier. In one or more embodiments, receiving an image further comprises imaging one of a digital, printed, or displayed image. In one or more embodiments, the method further comprises imaging the image using an imaging device. In one or more embodiments, the image is one of a prescription, a document, an academic transcript, a package, a label, a hangtag, and object. The imaging device may be a handheld imaging device. The imaging device may be communicatively coupled to a computing device. The one or more reference characters may be placed onto the image in random positional sequence and at a fixed frequency. The one or more reference characters may be placed onto the image in random positional sequence and at a random frequency. The one or more reference characters may be placed onto the image in a random position and at a fixed frequency. The one or more reference characters may be placed onto the image in a random position and at a random frequency. The authentication identifier may define orientation marks. Comparing the predetermined arrangement map includes comparing the orientation marks of the authentication identifier with orientation marks of the true authentication identifier. The one or more reference characters includes one or more reference characters with an intrinsic orientation, and comparing the predetermined arrangement map includes comparing the reference characters with an intrinsic orientation with reference characters of an intrinsic orientation of the true authentication identifier. The one or more reference characters include a signature array, and the signature array includes a string of language characters of a defined characteristic. Comparing the predetermined arrangement map includes comparing the reference characters with a signature array with the reference characters of a signature array of the true authentication identifier. The method may include determining orientation of the image based on the reference characters. The product authentication identifier may include natural language text and the one or more reference characters. The one or more reference characters may include a string of characters, and comparing the predetermined arrangement map comprises comparing the string of characters with a string of characters of the true authentication identifier. The string of characters of the true authentication identifier have a predetermined, approved orientation. The image may define an area in which product authentication identifier is not provided thereon and method may further include locating the area to determine orientation of the authentication identifier and comparing the orientation of the authentication identifier with the orientation of the true authentication identifier. The product authentication identifier further may further include a bar code provided onto the image after the product authentication identifier has been provided. The product authentication identifier may define a perimeter thereof that forms an intrinsic shape with a predetermined orientation, and the method may include comparing the intrinsic shape with a predetermined orientation with an intrinsic shape with a predetermined orientation of the true authentication identifier. The product authentication identifier may be provided on a display screen of a computing device. The predetermined arrangement may be a grid.

A method of determining differences between items of interest is provided. The method may include receiving an item of interest, wherein the item of interest is associated with a signature; comparing the item of interest to a set of reference images; determining a plurality of similarity scores between the item of interest and the set of reference images; determining an error vector based on the plurality of similarity scores; and comparing one or more error vectors to error vectors created from an authentic item associated with the signature.

A method of calculating the similarity between two or more images is provided. The method may include selecting a set of reference images; selecting a target image; scaling the target image substantially to the set of reference images; comparing the target image to the set of source images; determining a plurality of similarity scores between the set of reference images and the target image; and determining an error vector based on the plurality of similarity scores. The set of reference images may be a set of shapes. The shapes in the set of shapes may be approximately equivalent. The shapes may be separable relative to one another. At least eight different shapes may form the set of shapes. The shapes may be aligned or closely aligned to a particular axis.

A method of authenticating a document is provided. The method includes receiving a document to be authenticated; analyzing the document to create a signature; comparing the signature with a reference signature from an authentic document associated with the signature; and determining the document to be authenticated as authentic based on the comparison. The method may include not comparing the document to be authenticated to a copy of the authentic document.

A method of fitting entities to a grid or a predetermined arrangement is provided. The method includes receiving a set of entities, related position information, and a grid structure; initializing a data structure for storing entities; inserting a first entity into the data structure; determining a position of other entities in the grid structure relative to a currently evaluated entity; assigning a potential direction to the other entities relative to the currently evaluated entity; inserting each other entity into the data structure; and determining the grid location for each entity. Each entity may include an uninitialized link to the next closest entity in each direction, an initially empty list of votes for the location of the entity in the grid, a list of the closest entity which initially includes all of the entities in the set, and an uninitialized score indicating how well the entity fits in the grid. The method may include selecting a set of entities closest to the entity currently being operated upon. Selection of the starting element may be based upon a metric. The data structure for storing entities may be further based on a priority queue. The potential directions may be up, down, left, and right. The method may include filtering out entities that do not meet pre-defined criteria. The metric may be a grid fit score. The pre-defined criteria include at least one of being one of the four closest entities to the current entity, being correctly positioned relative to a positional label, being in an extreme position for the assigned direction, and having a consistent positional label.

A method of creating a self-authenticating document is provided. The method includes receiving a document; adding alignment marks to the document; creating a digital signature of the document; converting the digital signature into a visible mark; and adding the visible mark to the document.

A method of validating a self-authenticating document is provided. The method includes receiving an encoded document; reading a security mark on the encoded document; extracting a stored digital signature of the document from the security mark; processing the document to create a digital signature; comparing the digital signature to the stored digital signature; and authenticating the encoded document based on the comparison.

A computing device having computer control code stored thereon for authenticating and identifying a product is provided. The computer control code is configured for receiving an image that includes a product authentication identifier; identifying the product authentication identifier, wherein the product authentication identifier includes one or more reference characters; providing the one or more reference characters on a predetermined arrangement map; comparing the predetermined arrangement map with an arrangement map that matches a true authentication identifier; and determining whether the image has been altered based on the comparison of the predetermined arrangement map with the true authentication identifier.

An image that includes a product authentication identifier is provided. The identifier includes one or more reference characters. In one or more embodiments, the one or more reference characters are placed onto the image in random positional sequence and at a fixed frequency. In one or more embodiments, the one or more reference characters are placed onto the image in random positional sequence and at a random frequency. In one or more embodiments, the one or more reference characters are placed onto the image in a random position and at a fixed frequency. In one or more embodiments, the one or more reference characters are placed onto the image in a random position and at a random frequency. In one or more embodiments, the authentication identifier defines orientation marks. In one or more embodiments, the one or more reference characters comprises one or more reference characters with an intrinsic orientation. In one or more embodiments, the one or more reference characters comprises a signature array, and wherein the signature array comprises a string of language characters of a defined characteristic. In one or more embodiments, the product authentication identifier further comprises natural language text and the one or more reference characters. In one or more embodiments, the one or more reference characters comprise a string of characters. In one or more embodiments, the string of characters of the true authentication identifier have a predetermined, approved orientation. In one or more embodiments, the image defines an area in which product authentication identifier is not provided thereon. In one or more embodiments, the product authentication identifier further comprises a bar code provided onto the image after the product authentication identifier has been provided. In one or more embodiments, the product authentication identifier defines a perimeter thereof that forms an intrinsic shape with a predetermined orientation. In one or more embodiments, the product authentication identifier is provided on a display screen of a computing device. In one or more embodiments, the product authentication identifier is placed onto a border of an image, but not on the body of the image.

A method of authenticating a product is provided. The method includes, using an imaging device: imaging a product authentication identifier on a product at a first time; imaging a product authentication identifier on a product at a second time; and comparing the product authentication identifiers at respective first times and second times to determine if the product is authentic. The method may include comparing the product authentication identifiers at respective first times and second times with a databank of true product authentication identifiers. The databank of true product authentication identifiers are stored on an external server. A system is provided that includes a databank of true product authentication identifiers; and an imaging device in communication with the databank and that is configured to image a product authentication identifier and compare the product authentication identifier with a respective true product authentication identifier in the databank. The imaging device is configured to image the product authentication identifiers at multiple times. The imaging device may be a smart phone.

BRIEF DESCRIPTION OF THE DRAWINGS

Figure 1:
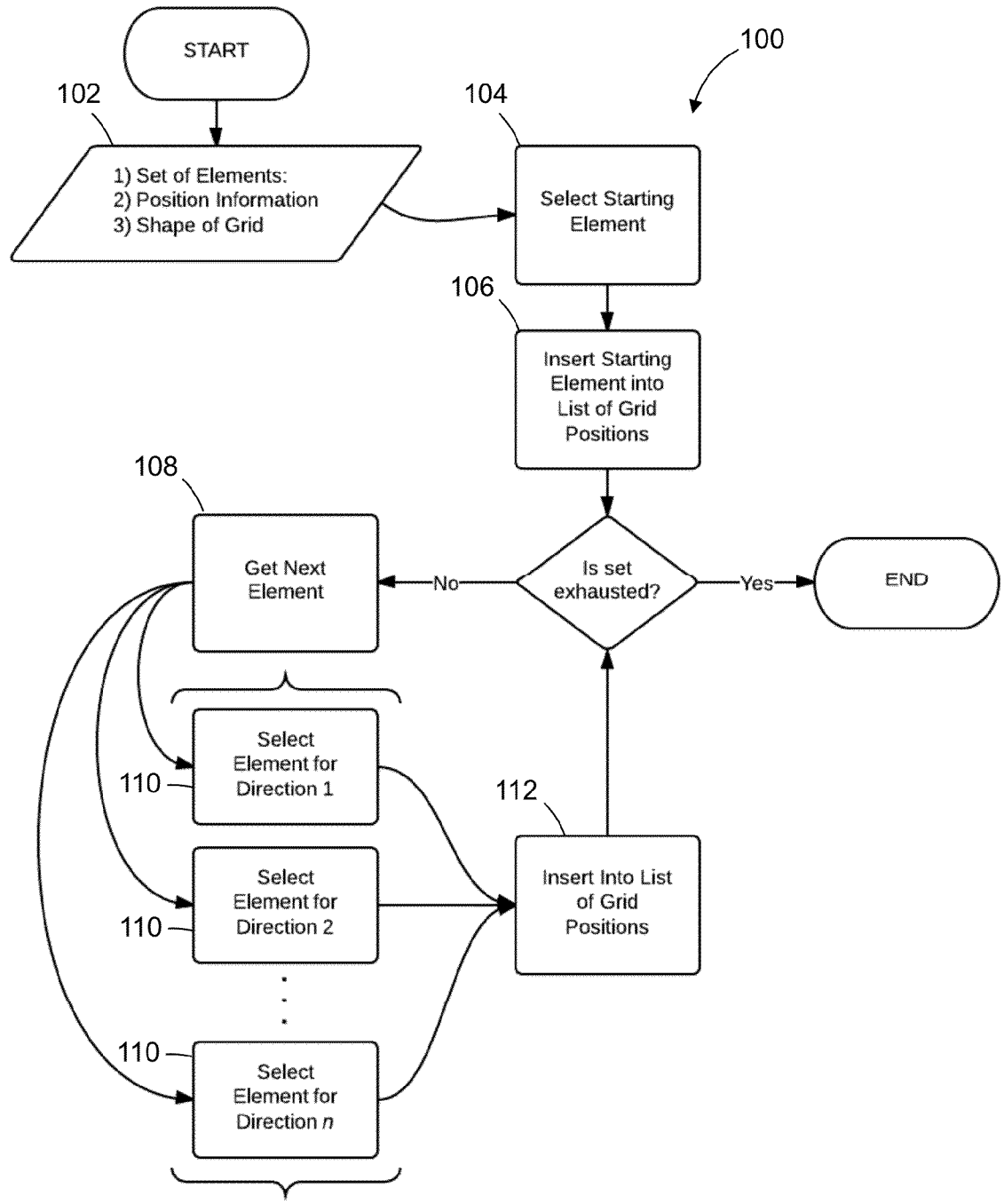
Figure 2:
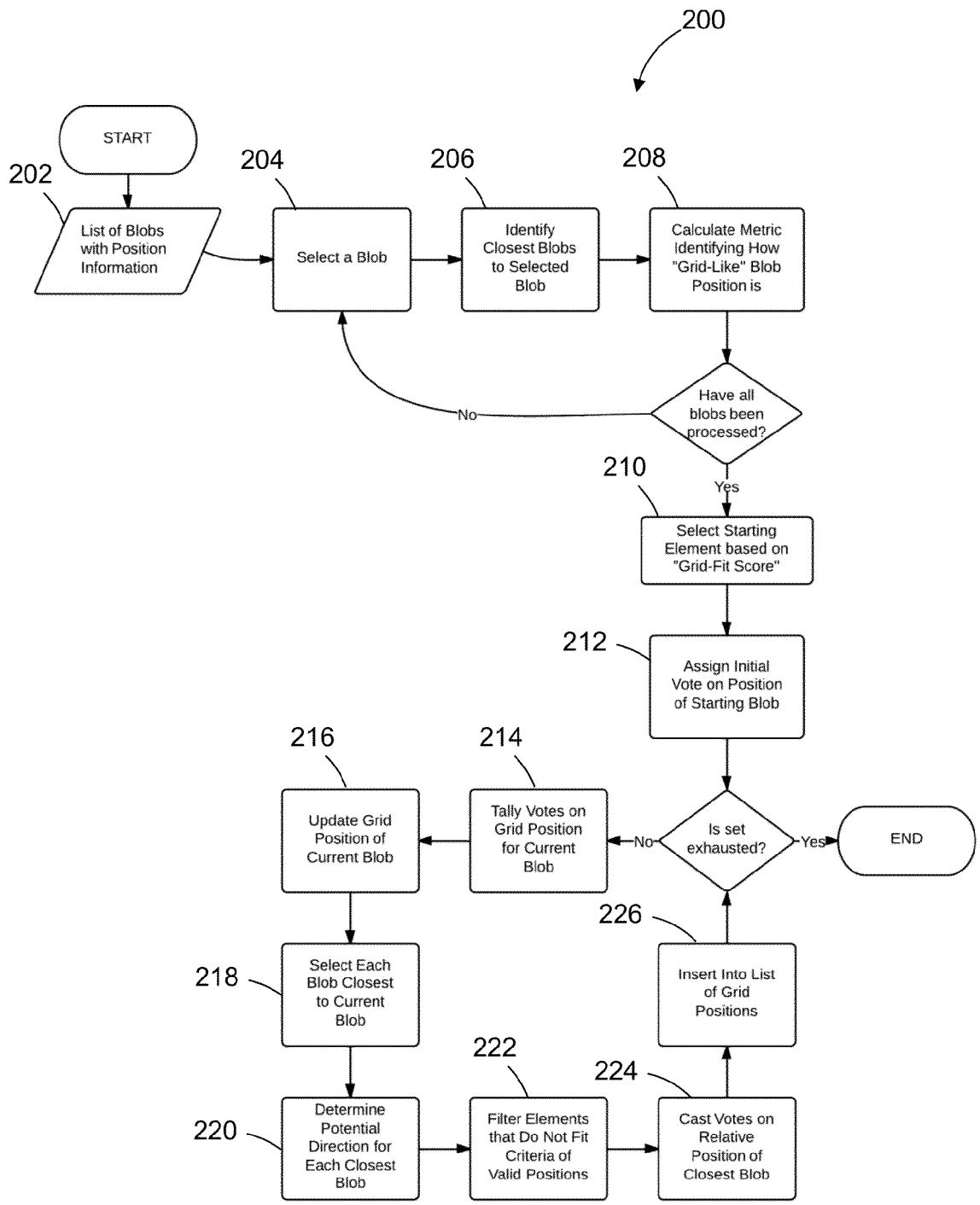
Figure 3:
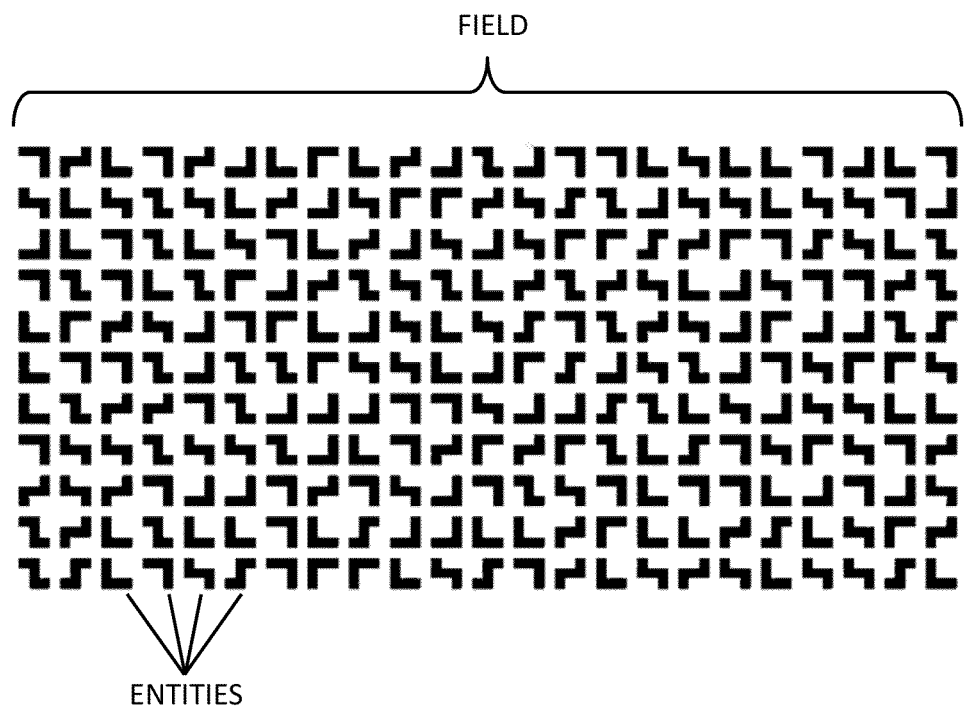
Figure 4:
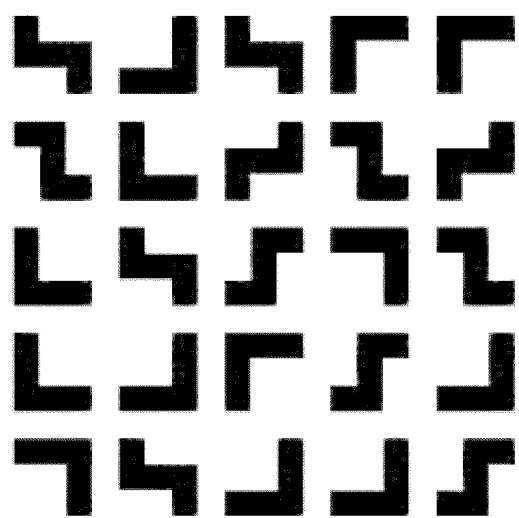
Figure 5:
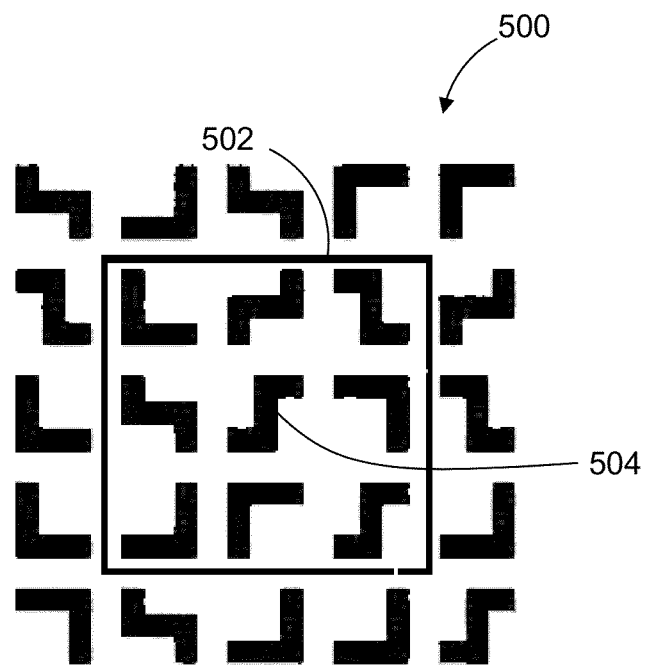
Figure 6:
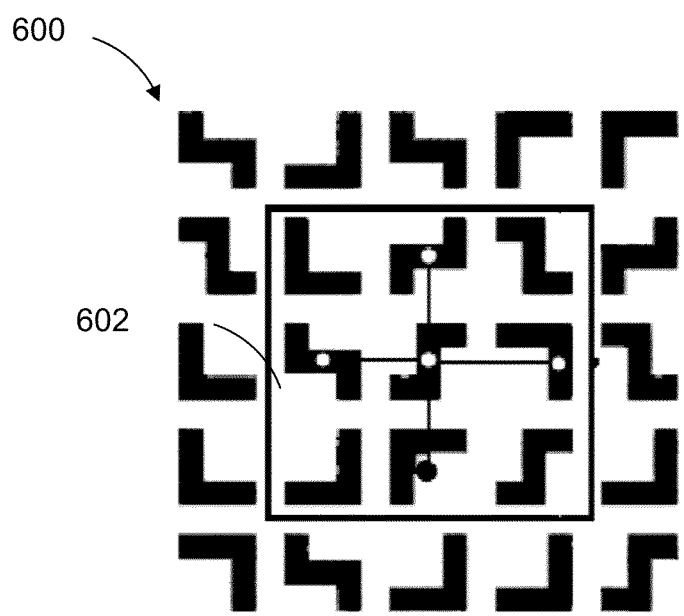
Figure 7:
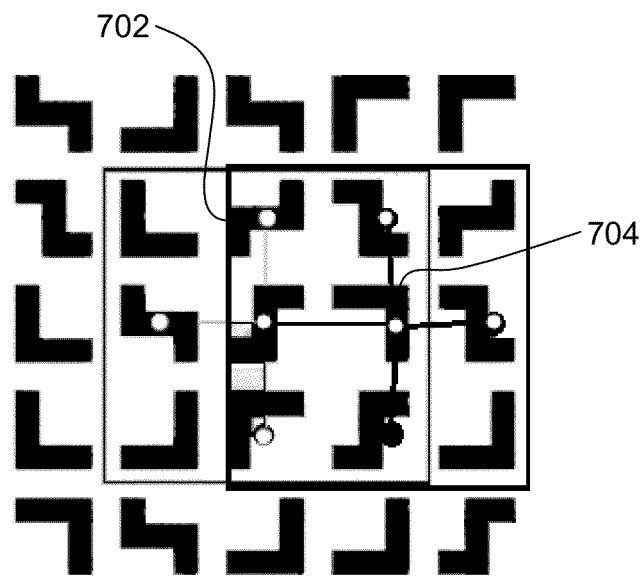
Figure 8:
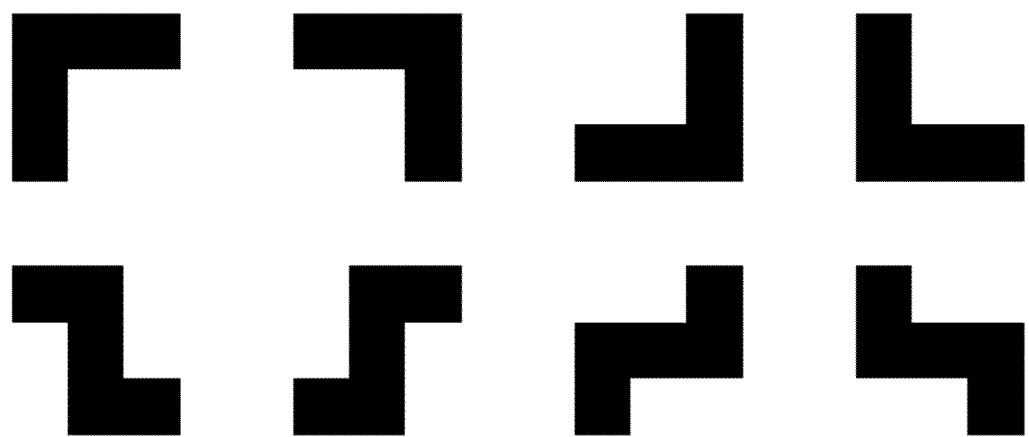
Figure 9:
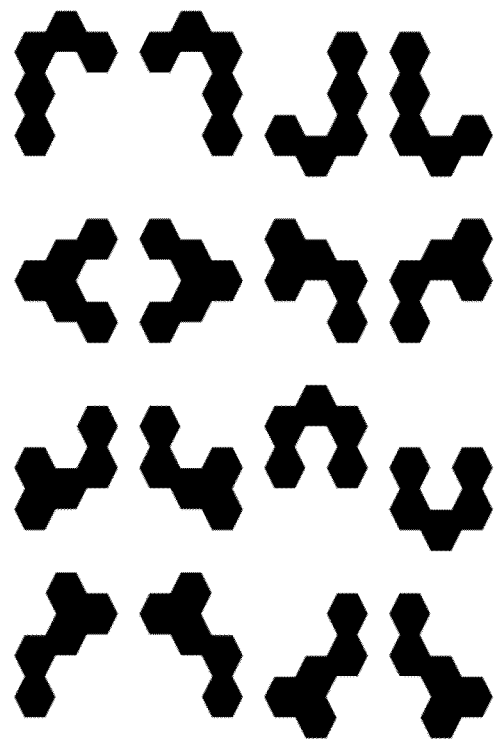
Figure 10:
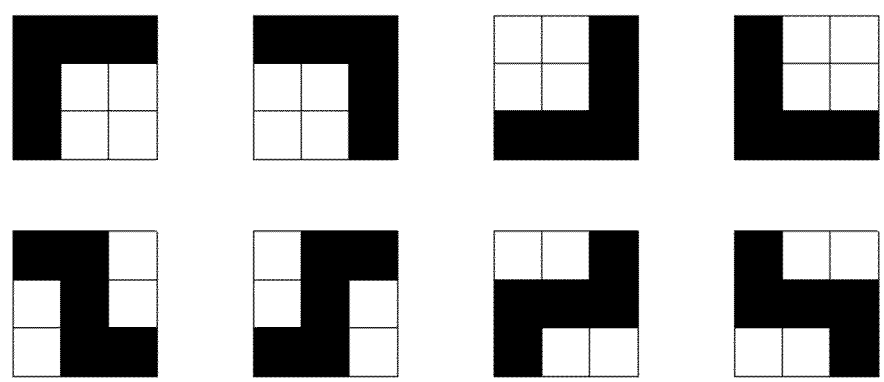
Figure 11:
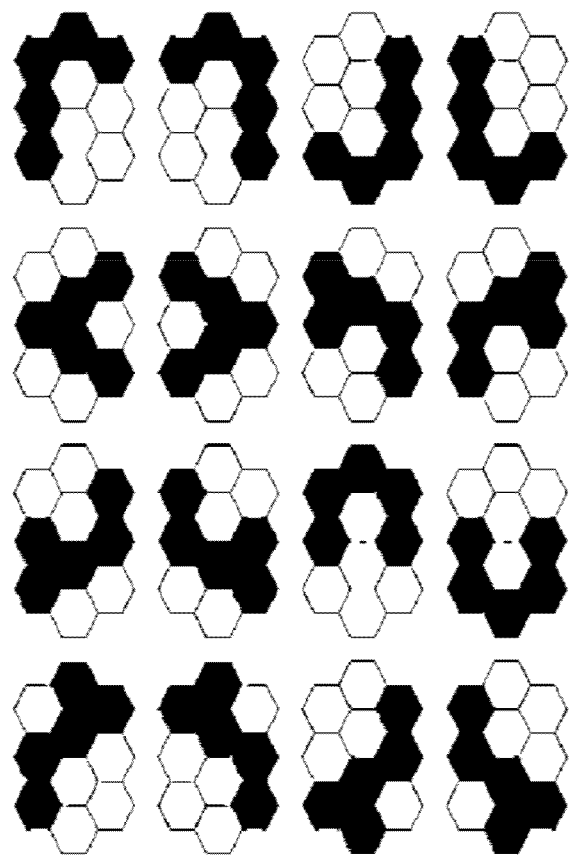
Figure 12:
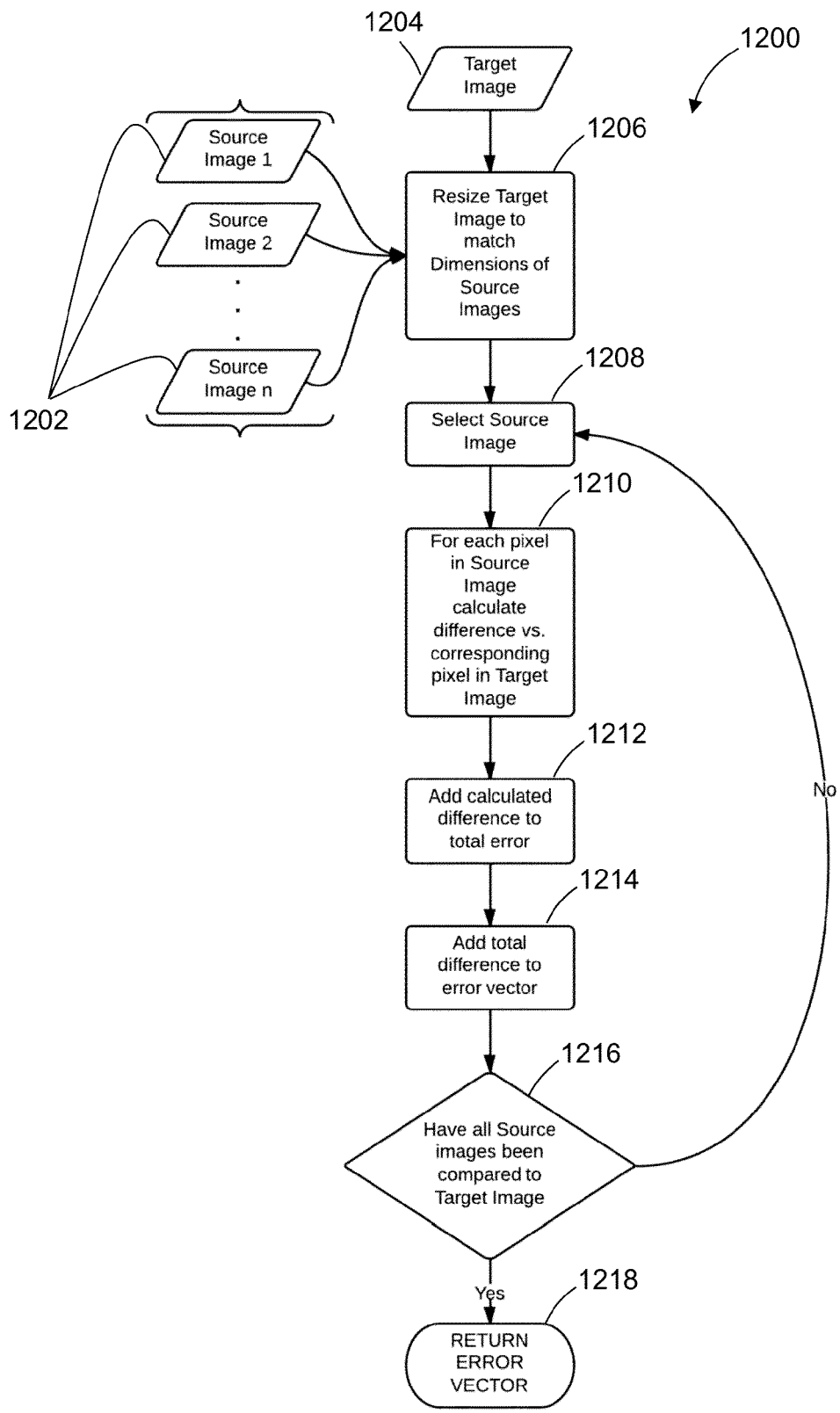
Figure 13:
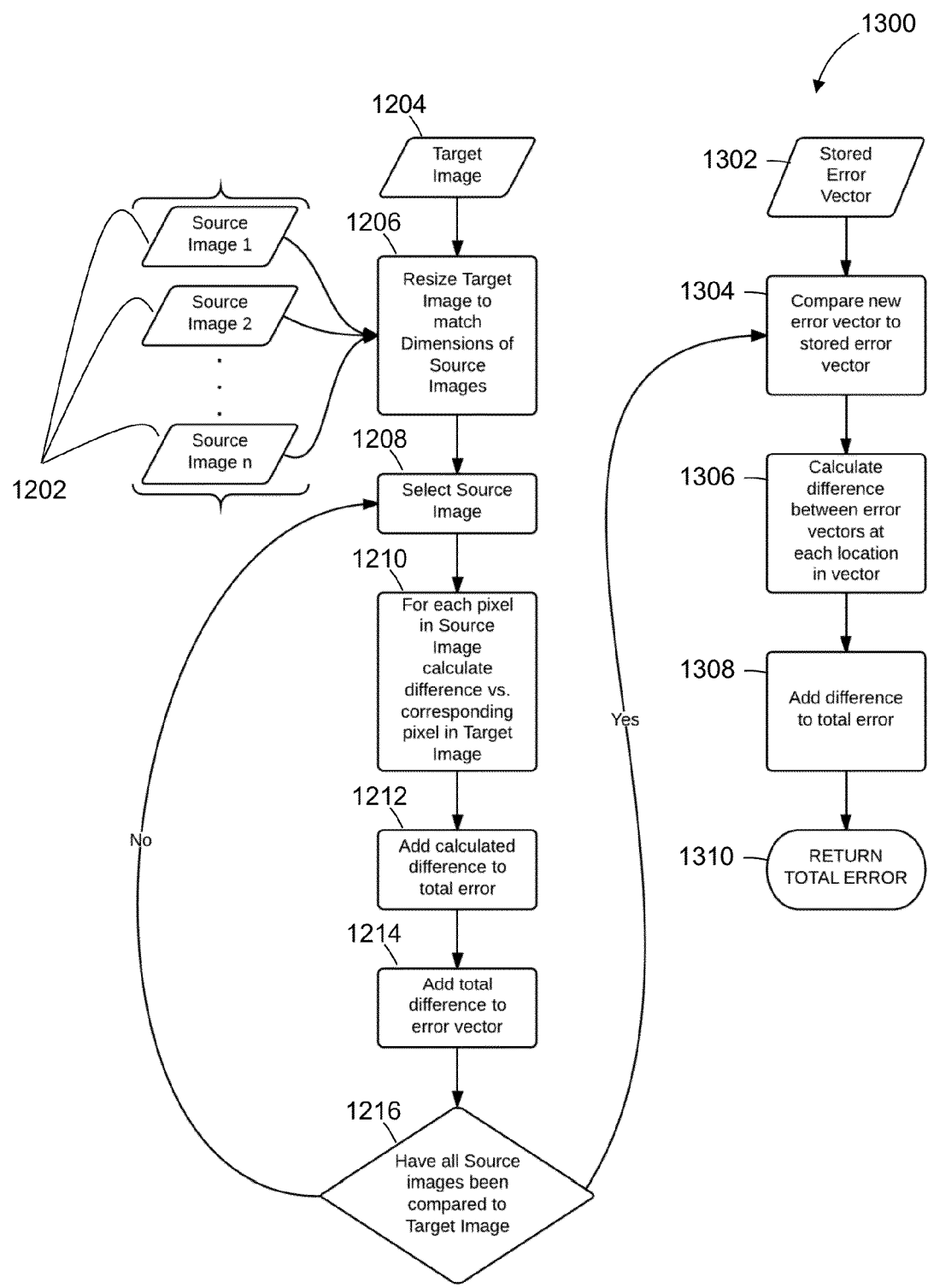
Figure 14A:
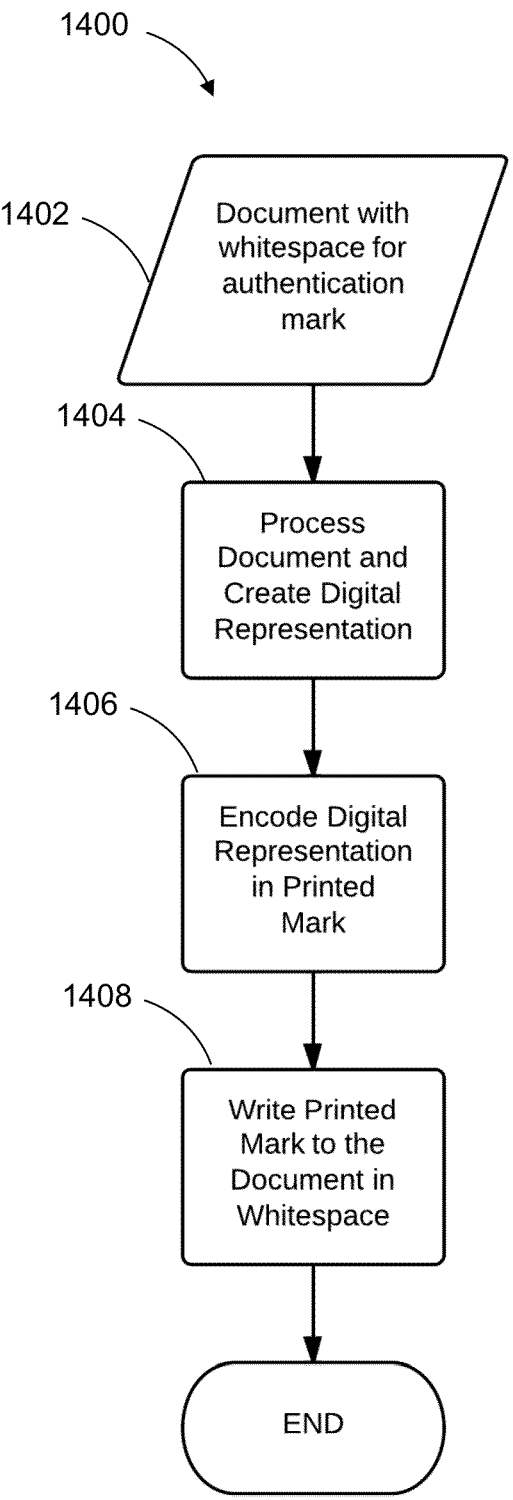
Figure 14B:
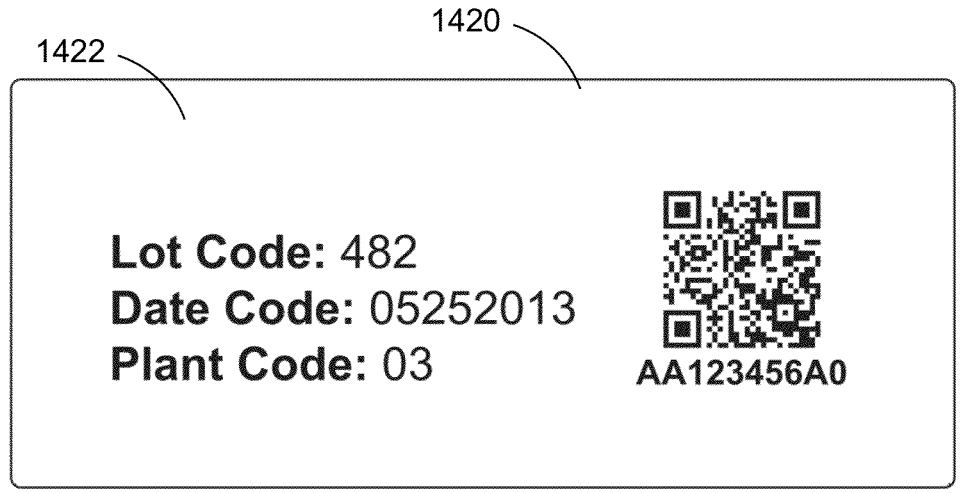
Figure 14C:
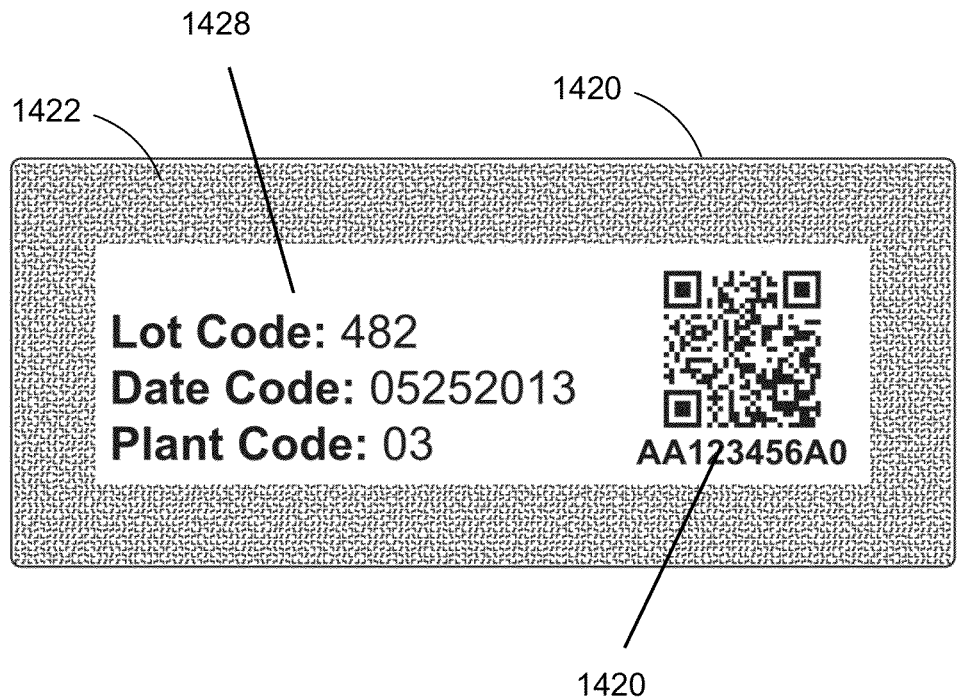
Figure 15:
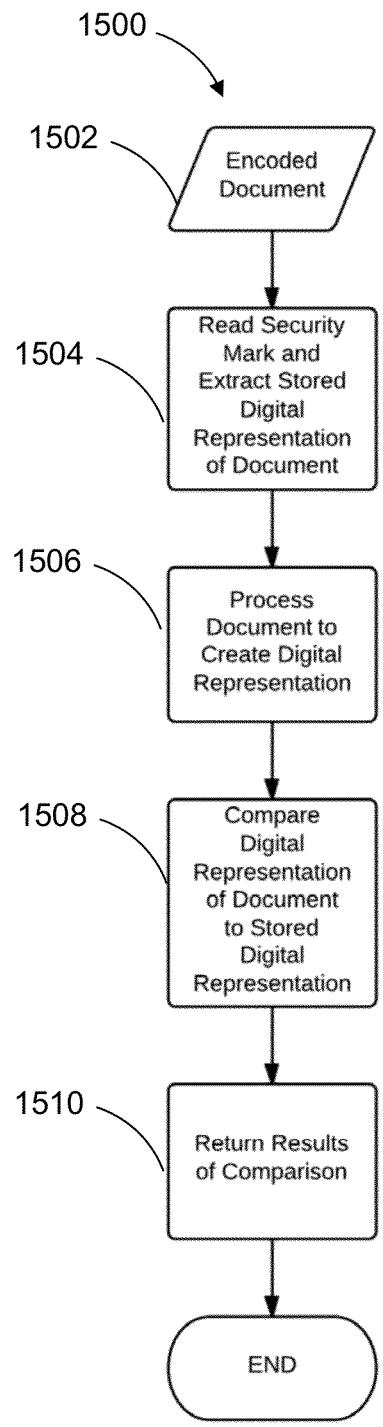
Figure 16:
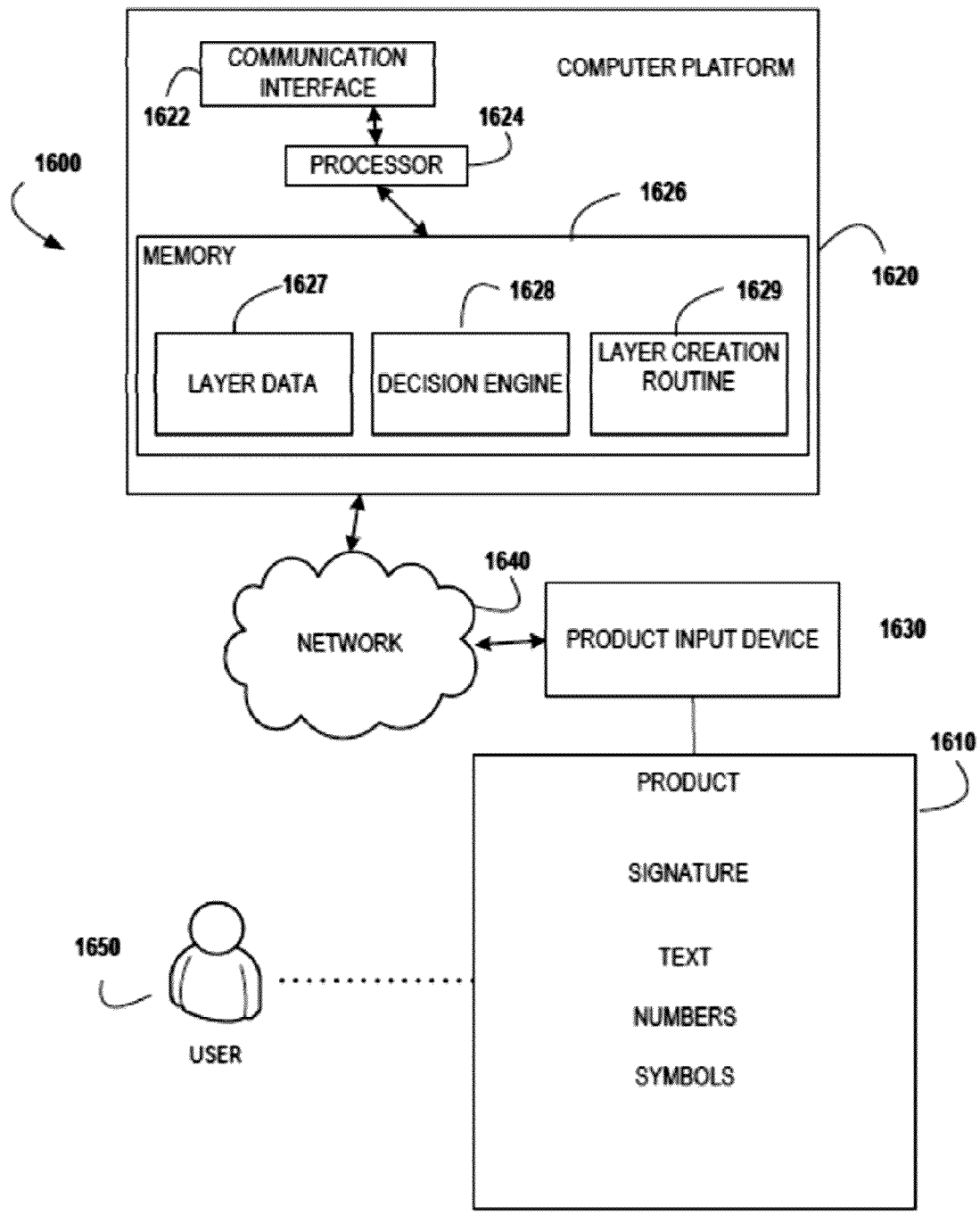
Figure 17:
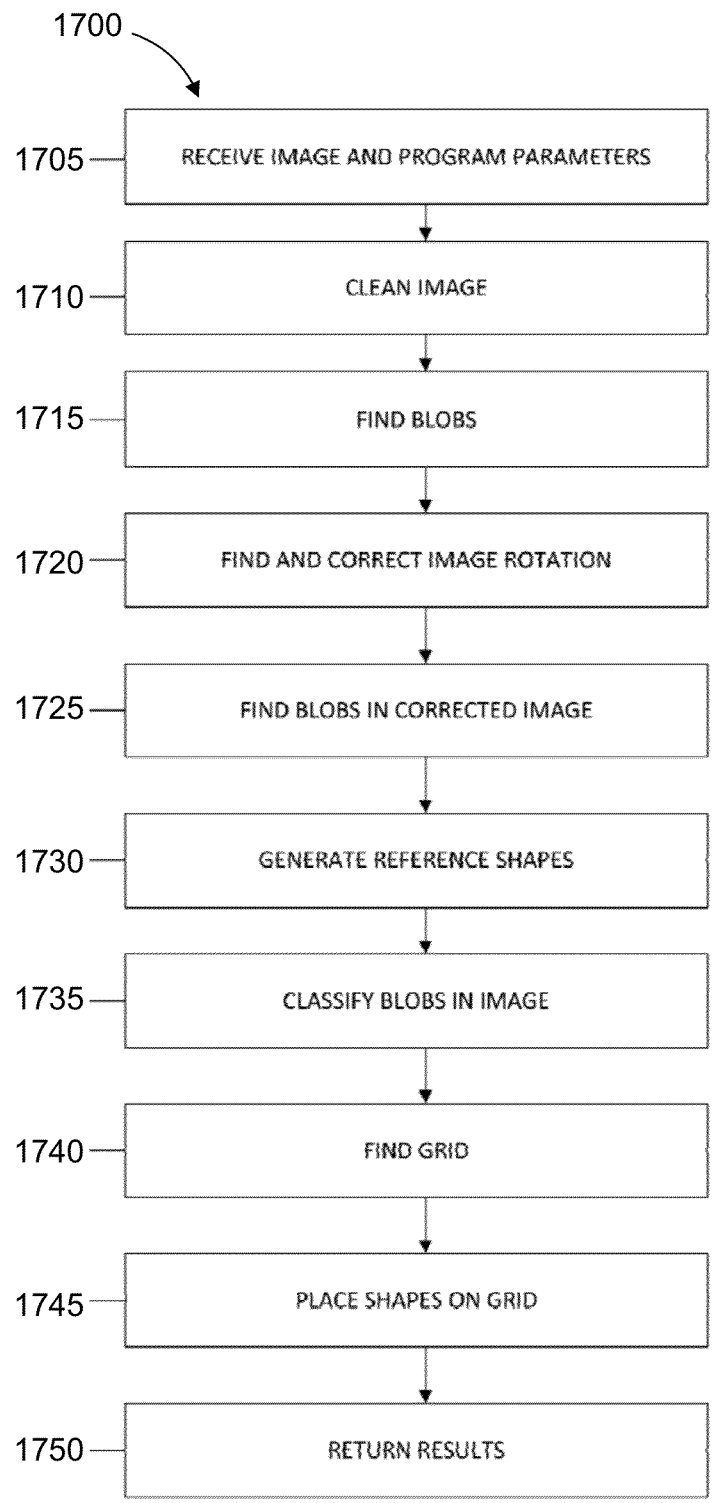
Figure 18A:
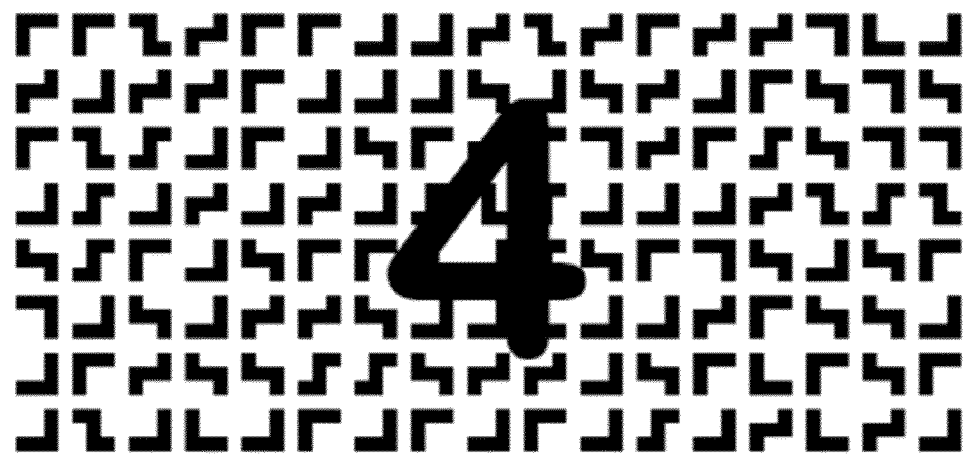
Figure 18B:
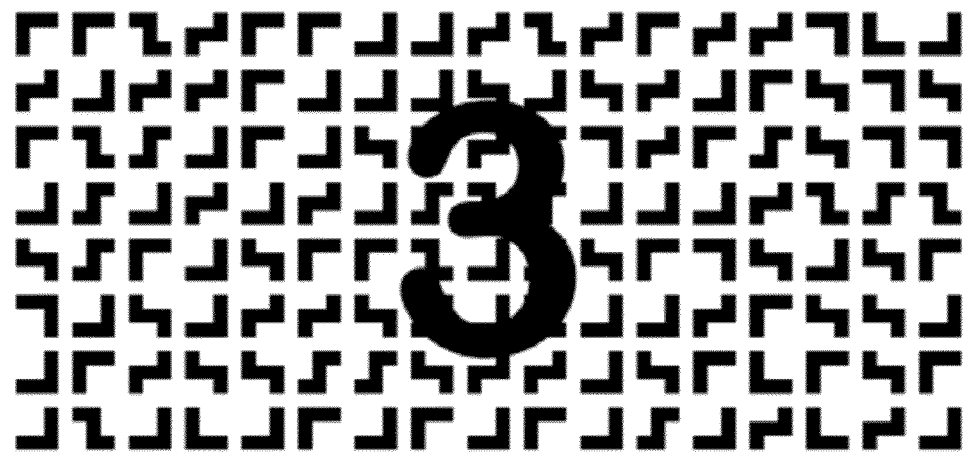
Figure 18C:
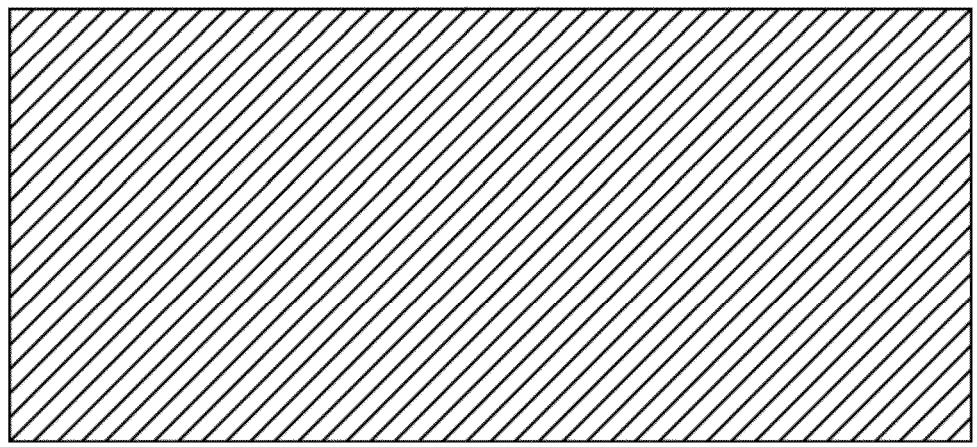
Figure 18D:
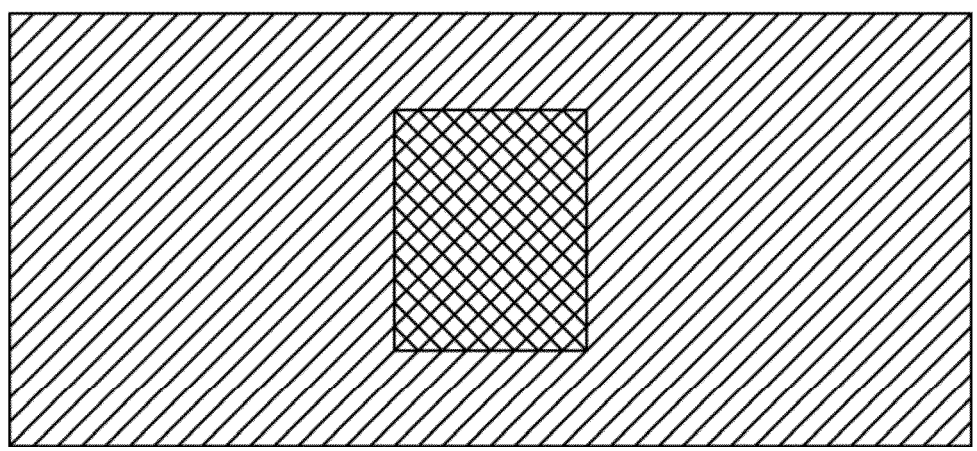
Figure 20C:
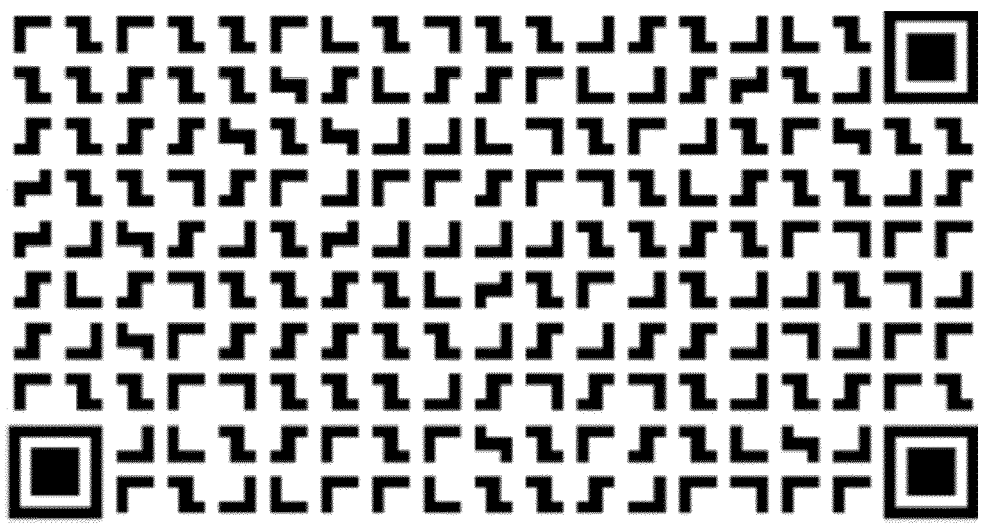
Figure 20D:
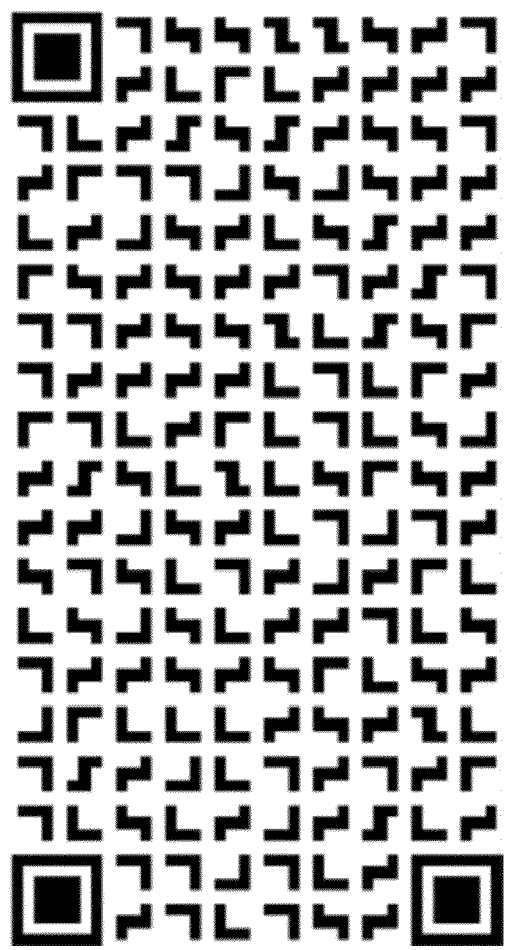
Figure 21:
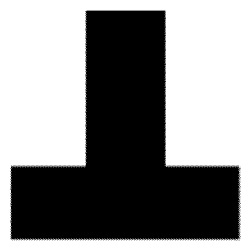
Figure 22A:
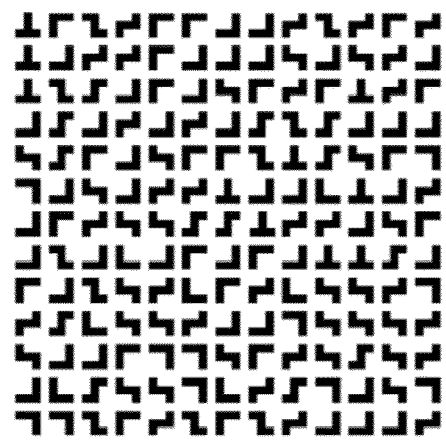
Figure 22B:
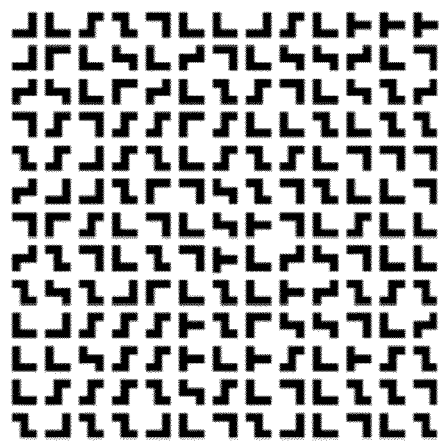
Figure 22C:
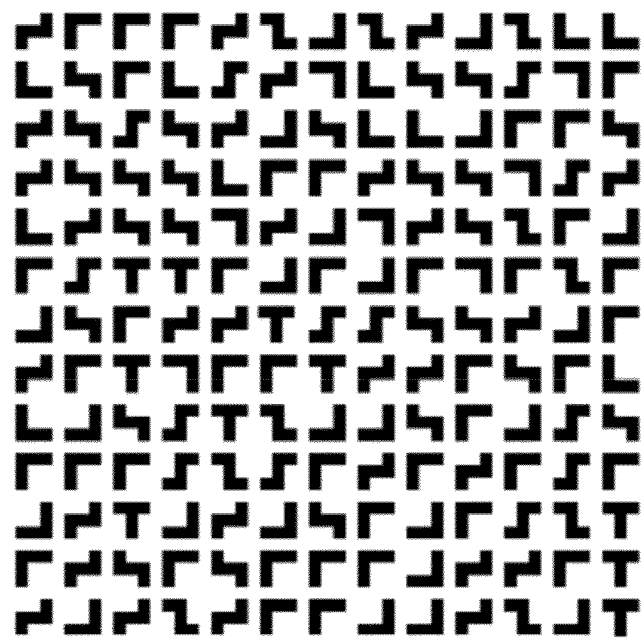
Figure 22D:
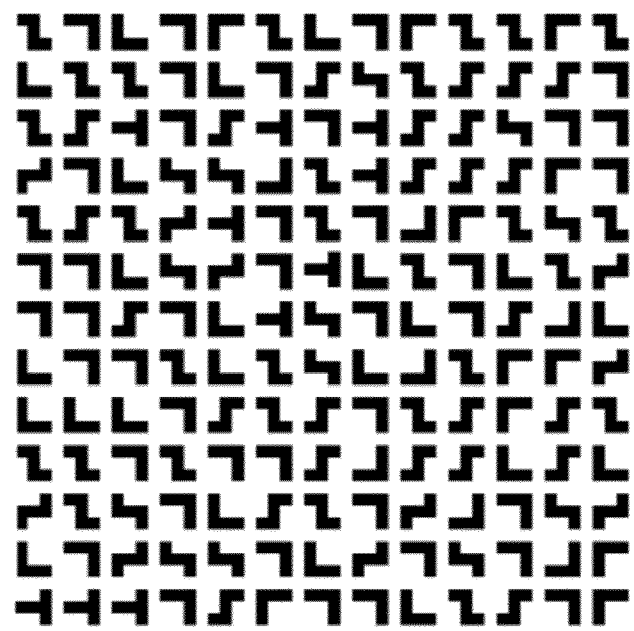
Figure 25B:
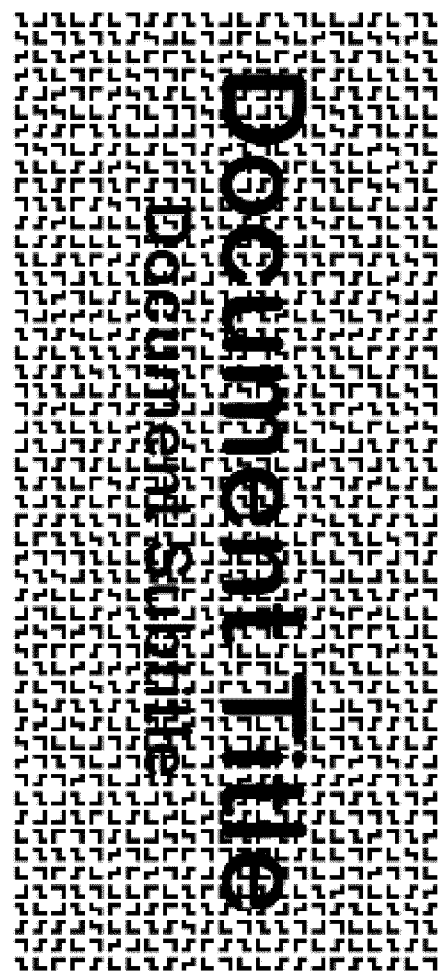
Figure 25C:
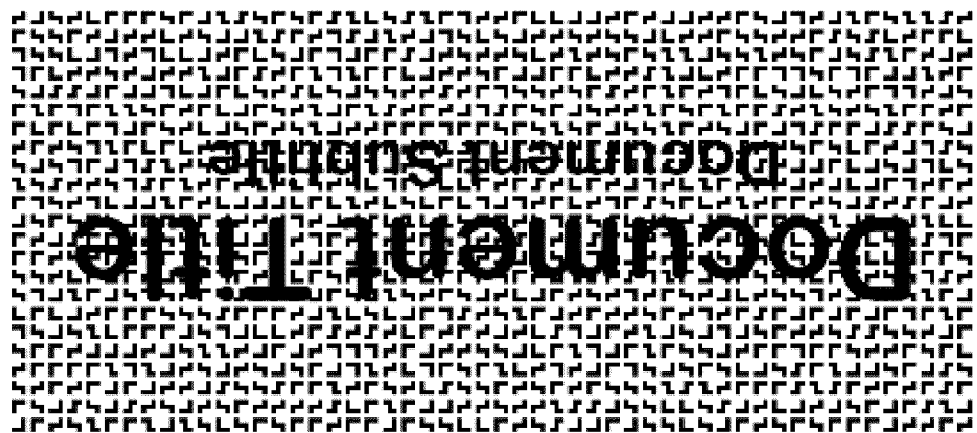
Figure 25D:
Figure 26A:
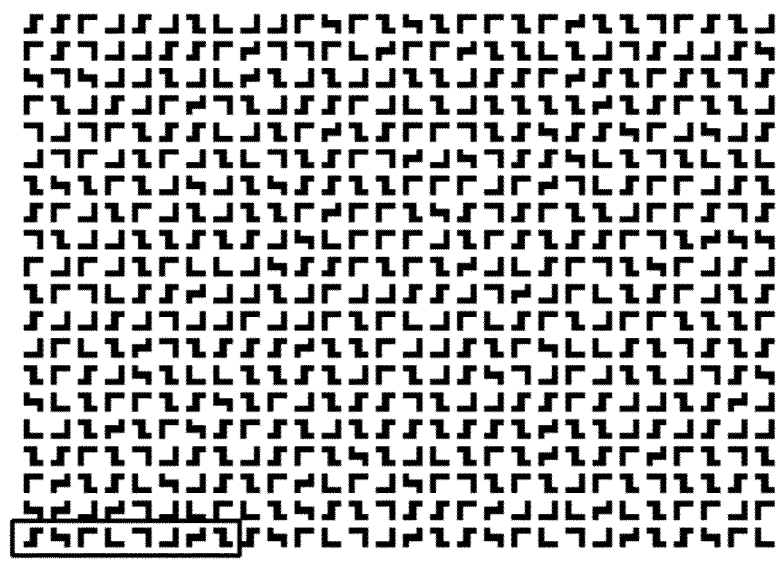
Figure 26B:
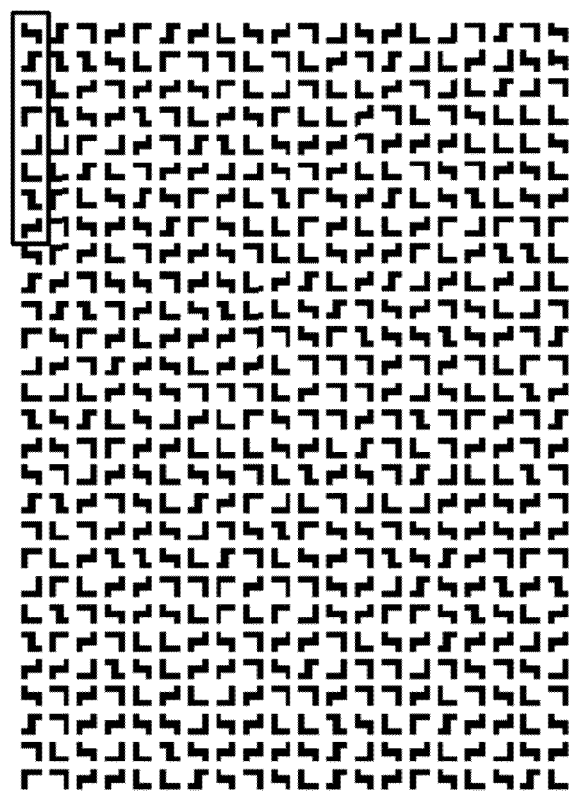
Figure 26C:
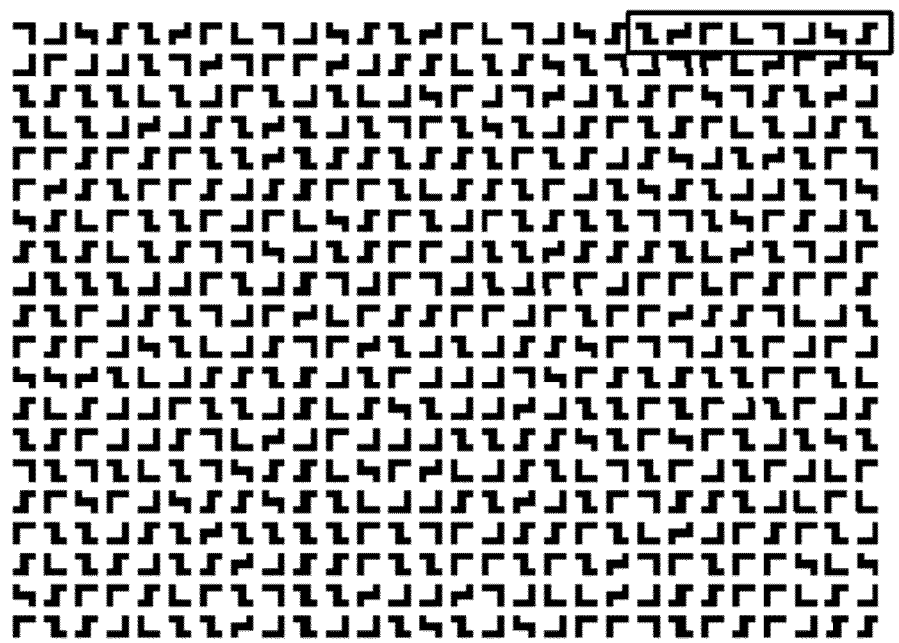
Figure 26D:
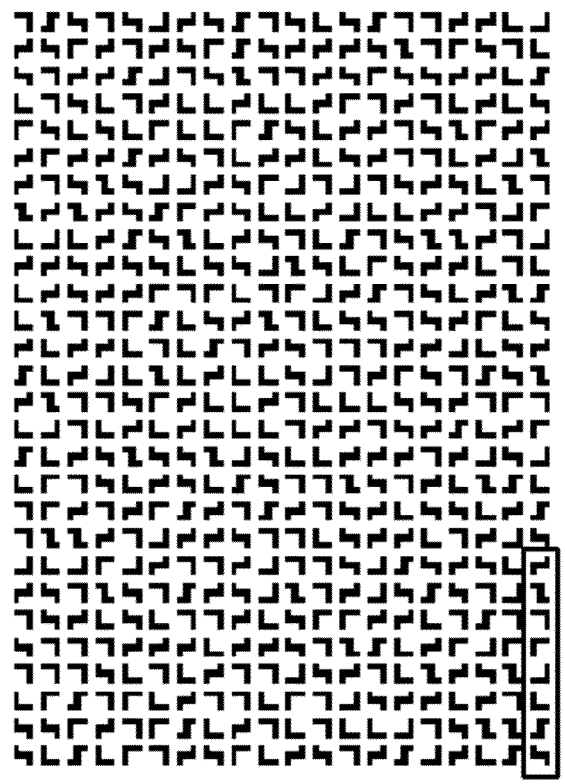
Figure 27A:
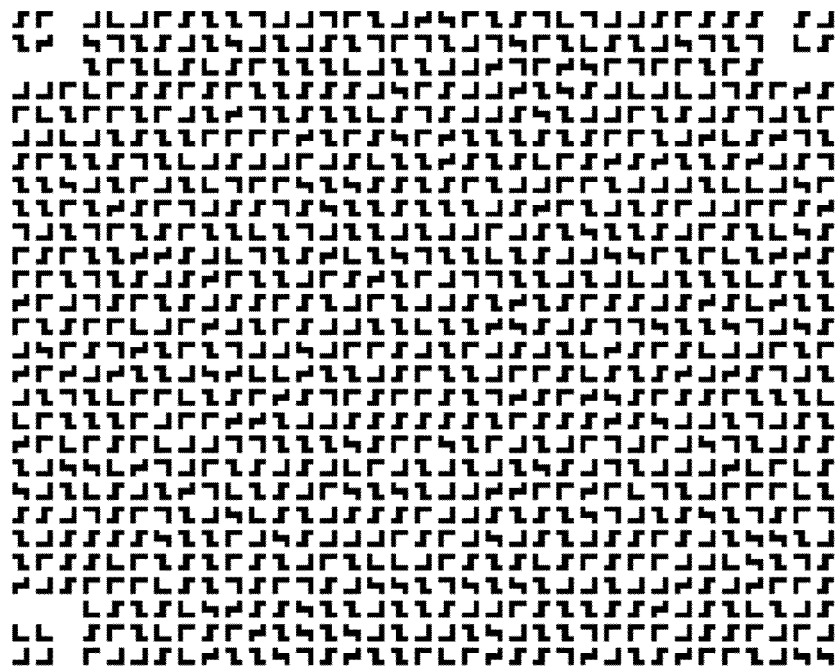
Figure 27B:
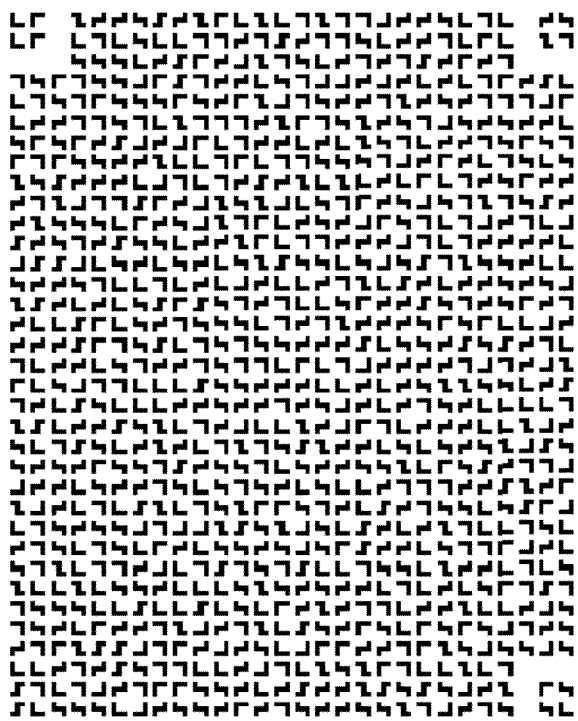
Figure 27C:
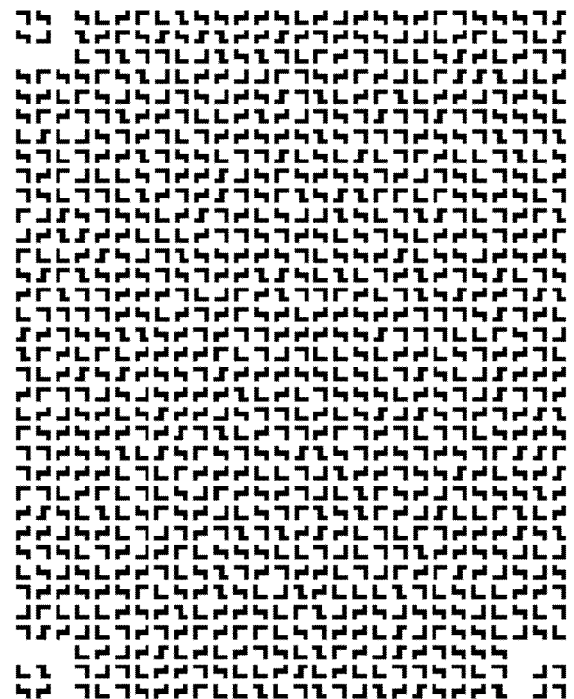
Figure 27D:
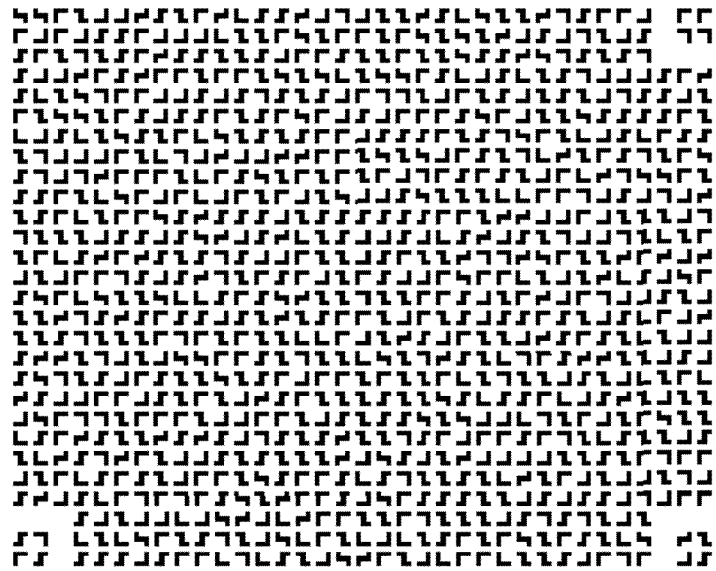
Figure 28A:
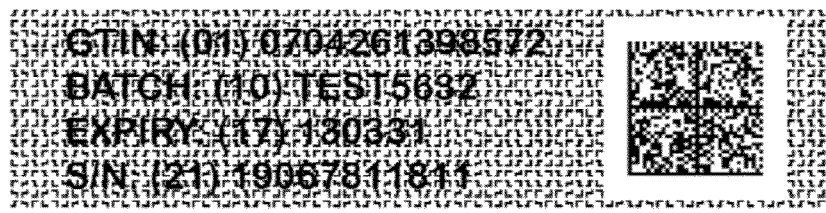
Figure 28C:
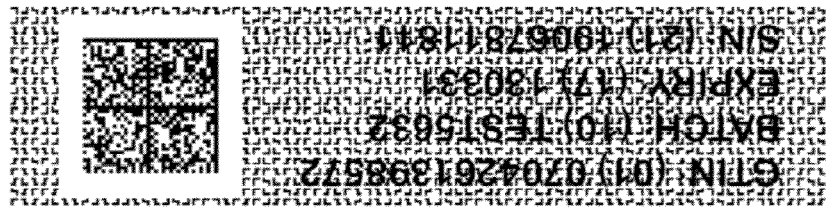
Figure 28B:
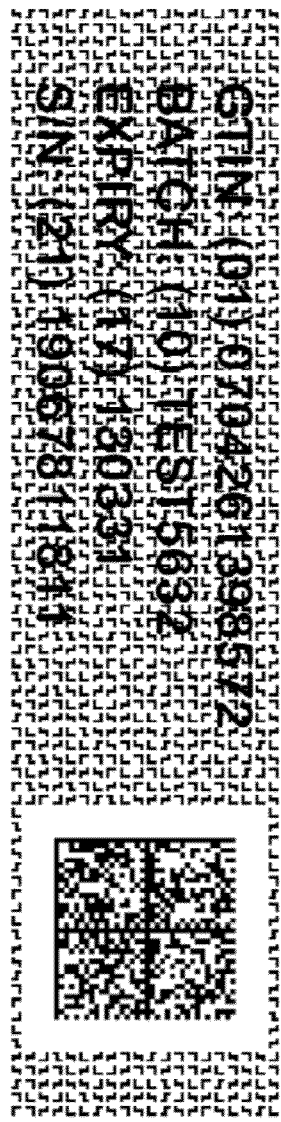
Figure 28D:
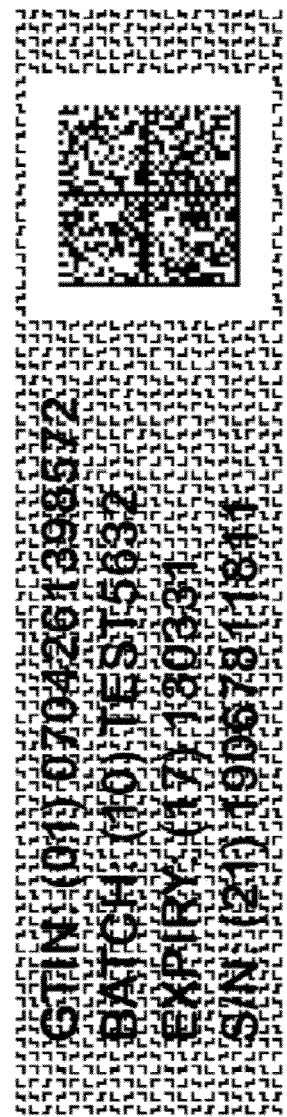
Figure 29A:
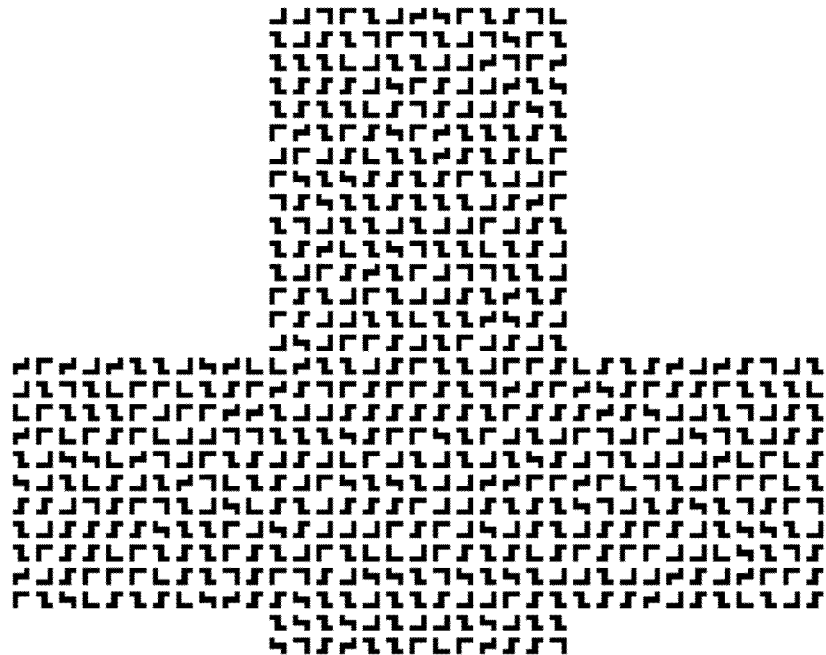
Figure 29B:
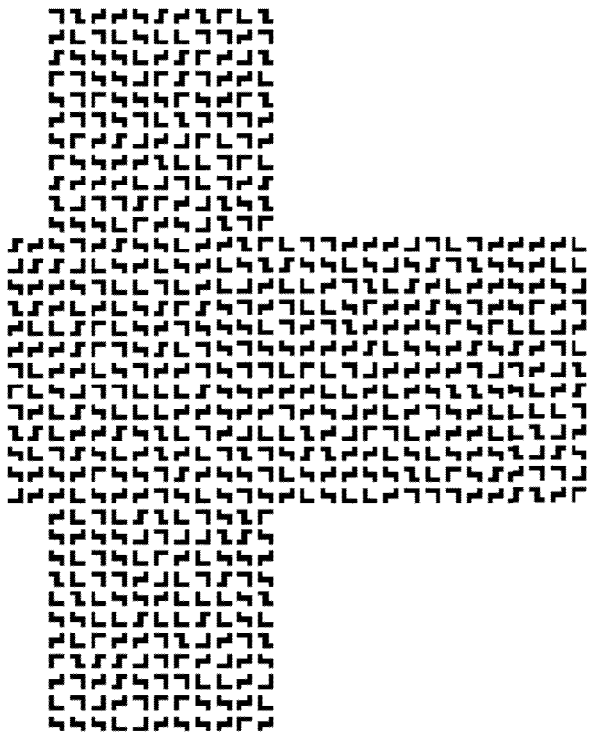
Figure 29C:
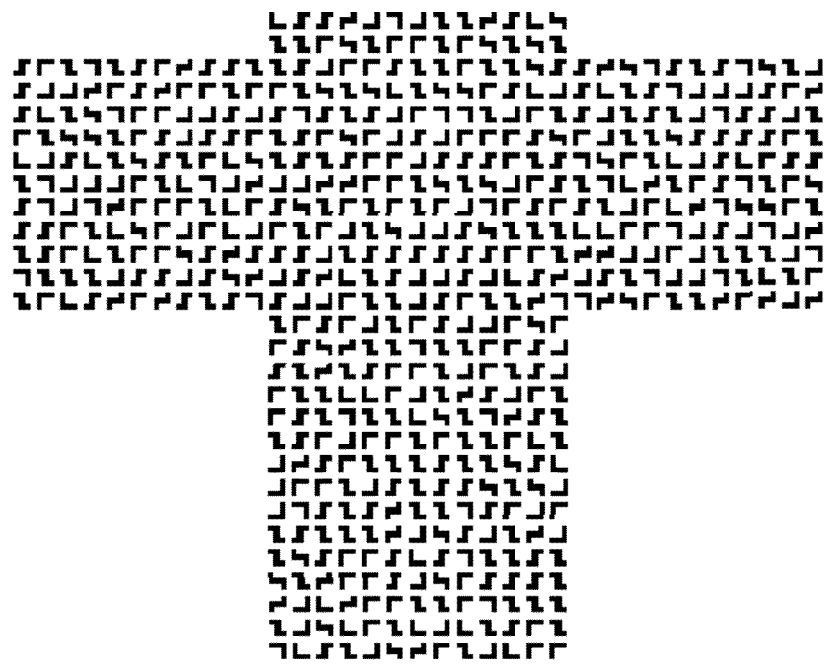
Figure 29D:
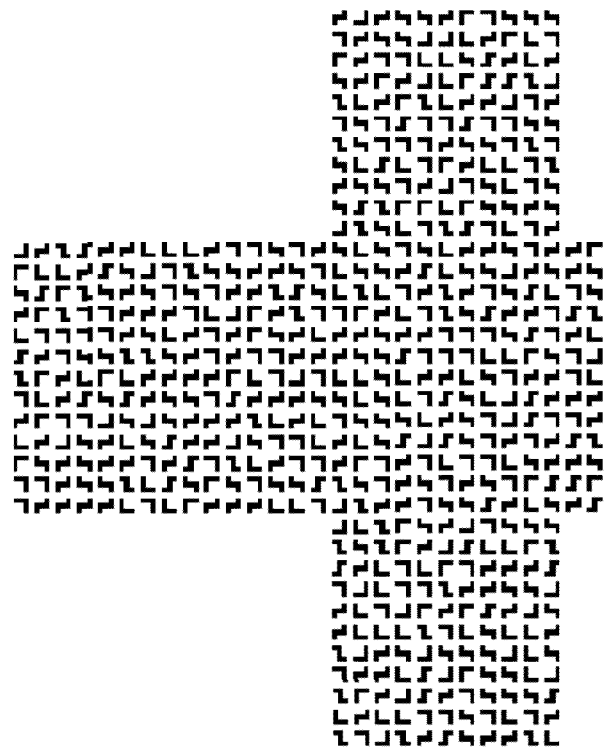
Figure 30A:
Figure 30B:
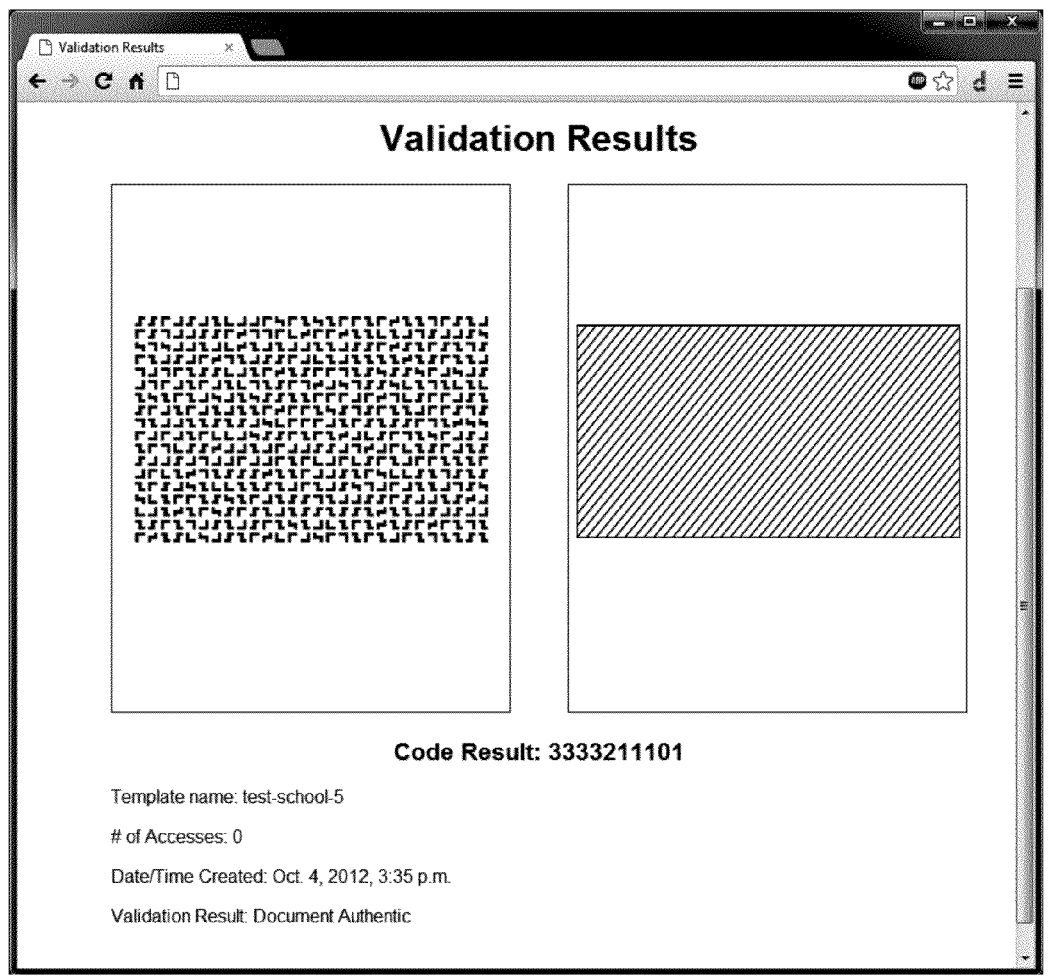
Figure 30C:
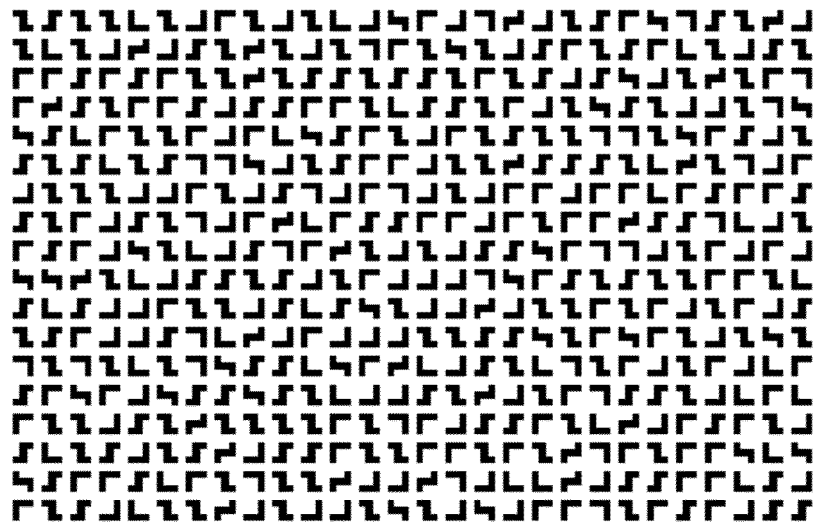
Figure 30D:
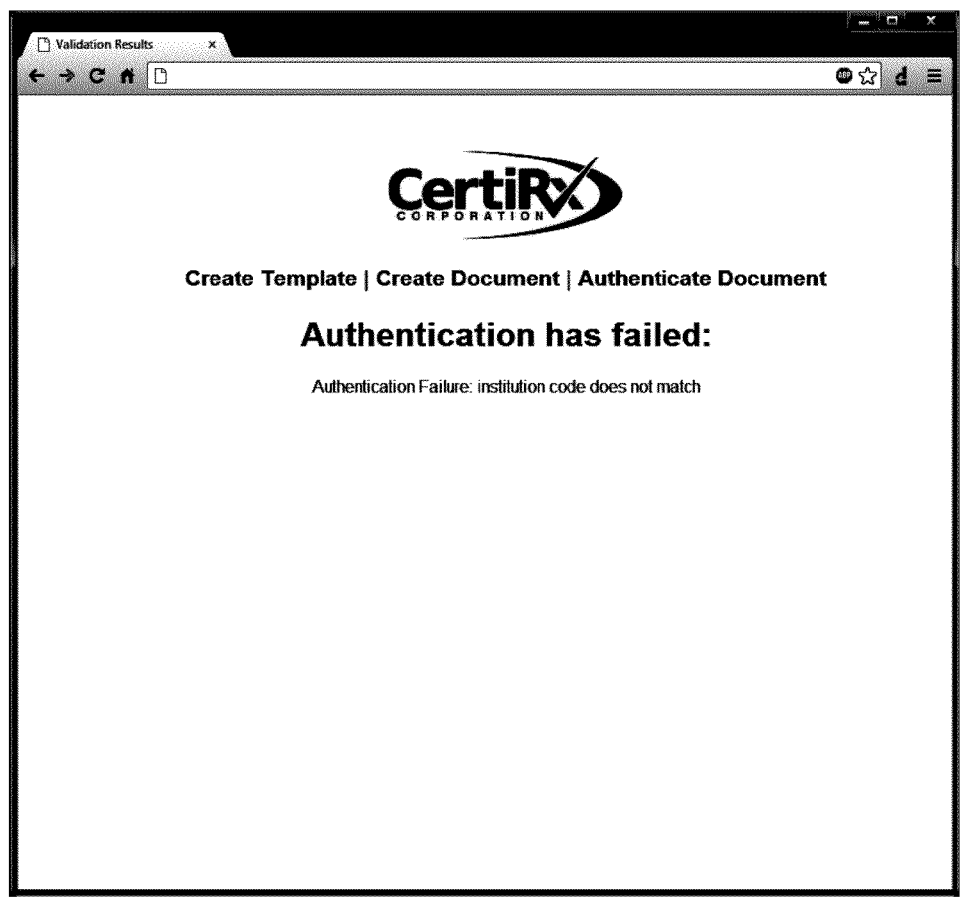
Figure 31:
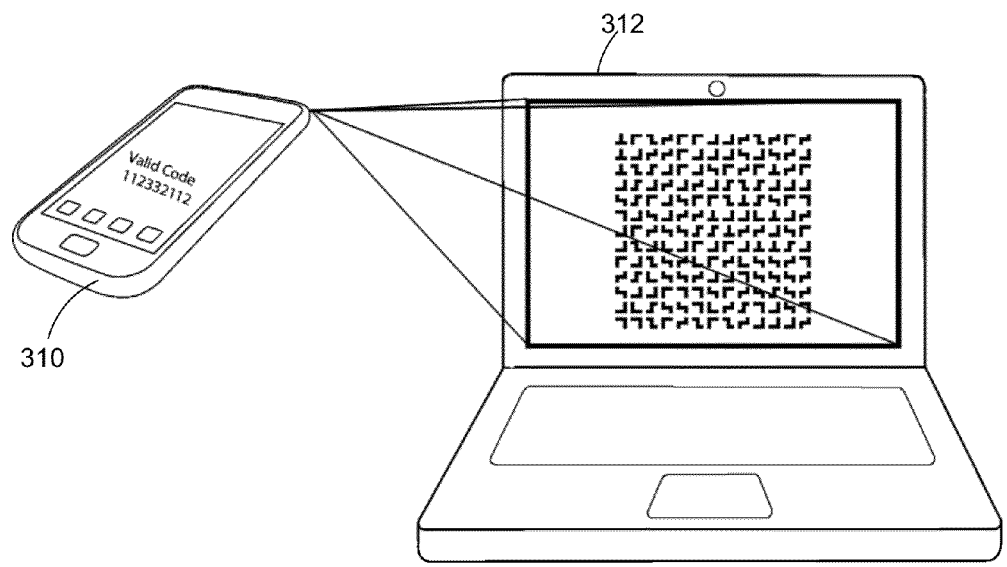
Figure 32:
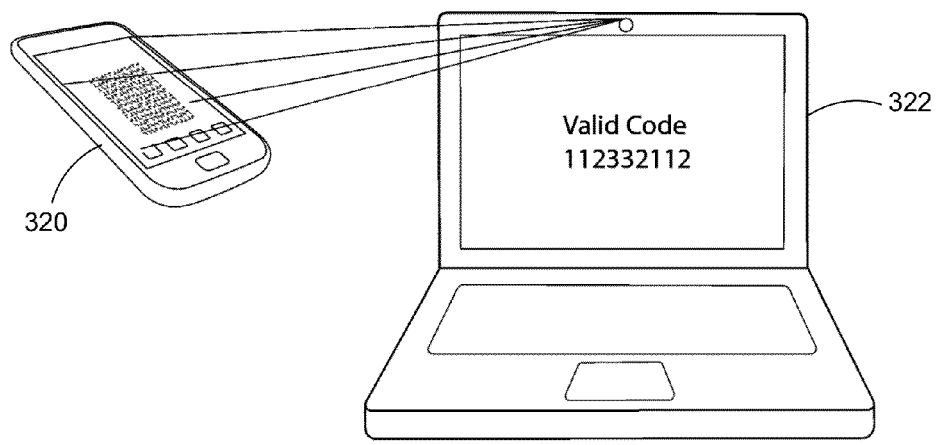
Figure 33:
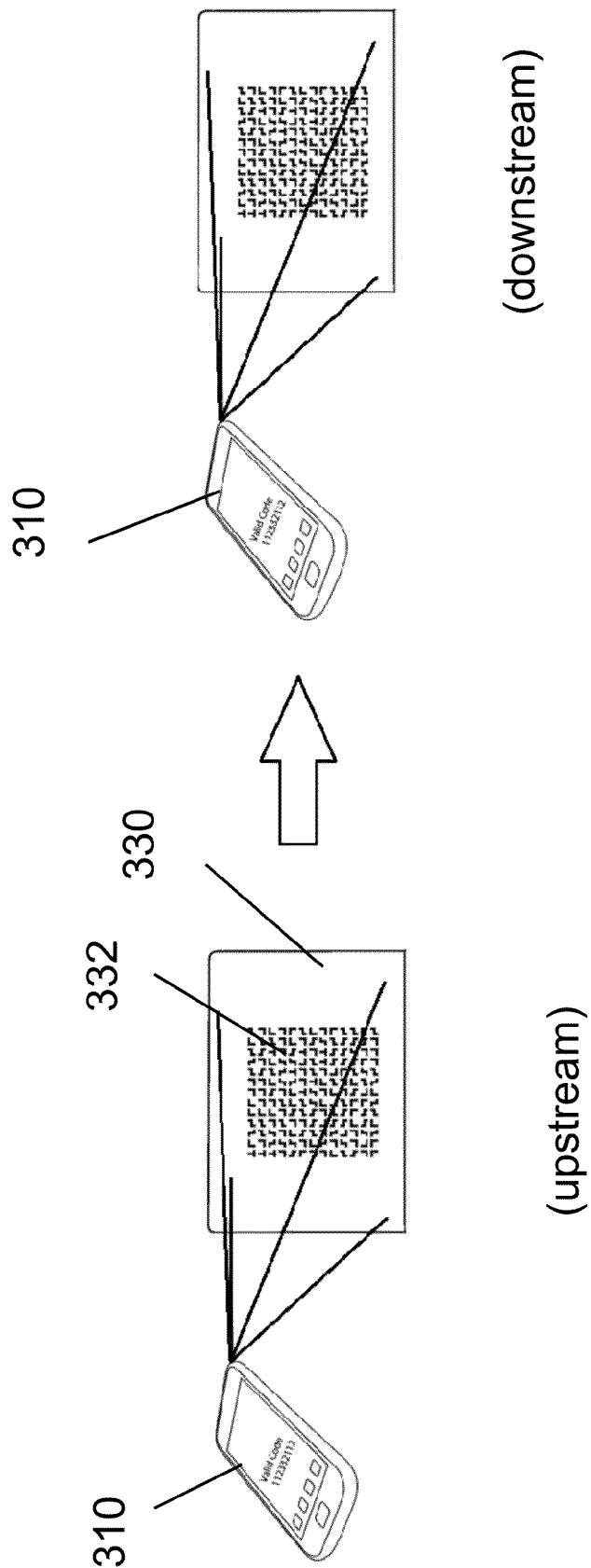
Figure 34:
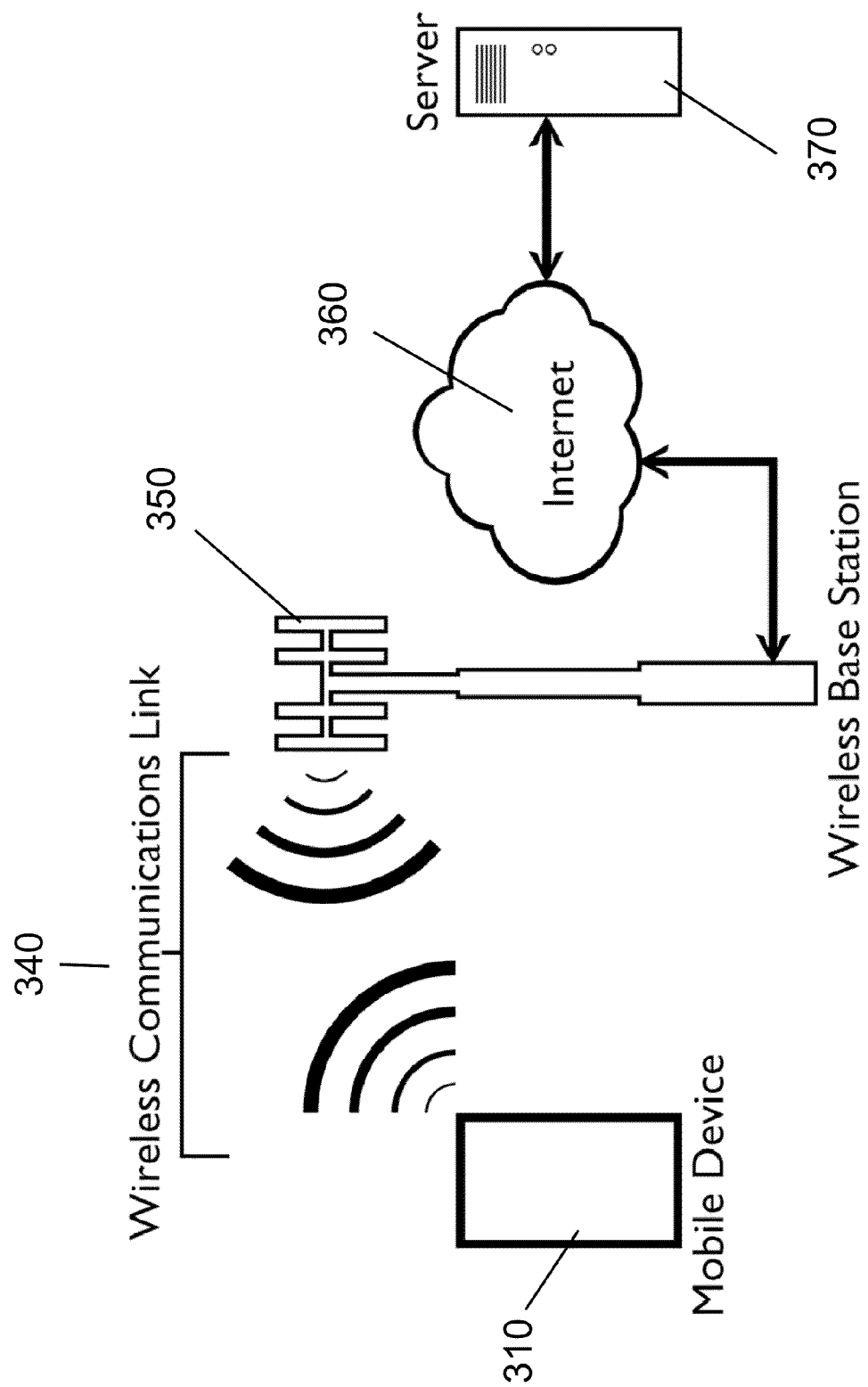

Having thus described embodiments of the present invention in general terms, reference will now be made to the accompanying drawings, which are not necessarily drawn to scale, and wherein:

FIG. 1 illustrates a flowchart containing one or more methods of authenticating an encoded field from a secured product according to one or more embodiments disclosed herein;

FIG. 2 illustrates a flow chart depicting one or more methods disclosed herein;

FIG. 3 illustrates a rendering of a field fit to a grid according to one or more embodiments disclosed herein;

FIG. 4 illustrates a working area of a field according to one or more embodiments disclosed herein;

FIG. 5 illustrates a boxed area with a blob according to one or more embodiments disclosed herein;

FIGS. 6 and 7 illustrates the relationship of blobs in the field according to one or more embodiments disclosed herein;

FIGS. 8 and 9 illustrate one or more symbol sets according to one or more embodiments disclosed herein;

FIGS. 10 and 11 illustrate one or more shapes of contiguous elements according to one or more embodiments disclosed herein;

FIG. 12 illustrates one or more methods disclosed herein;

FIG. 13 illustrates one or more methods disclosed herein;

FIG. 14A illustrates one or more methods disclosed herein;

FIGS. 14B and 14C illustrate one or more documents using the one or more methods of FIG. 14A according to one or more embodiments disclosed herein;

FIG. 15 illustrates one or more methods disclosed herein;

FIG. 16 illustrates a system according to one or more embodiments disclosed herein;

FIG. 17 shows the process of authenticating an encoded field from a secured product;

FIG. 18A shows a number on an encoded field;

FIG. 18B shows a changed number on an encoded field;

FIG. 18C shows an example visualization of analysis of the encoded field in FIG. 18A;

FIG. 18D shows an example visualization of analysis of the encoded field in FIG. 18B where an alteration has been detected;

FIG. 19 shows an example set of symbols used as entities for the purposes of code creation;

FIG. 20A shows an example of utilizing orientation marks to designate a valid orientation where only one orientation is valid and all others are invalid;

FIGS. 20B, 20C, and 20D demonstrate an invalid orientation of the item in 20A;

FIG. 21 shows an example of an entity with a single valid orientation;

FIG. 22A shows an example of utilizing orienting entities to designate a valid orientation where only one orientation is valid and all others are invalid;

FIGS. 22B, 22C, and 22D demonstrate an invalid orientation of the item in 22A;

FIG. 23 shows a set of entities comprised of text and decorated text;

Figures 24B, 24C:
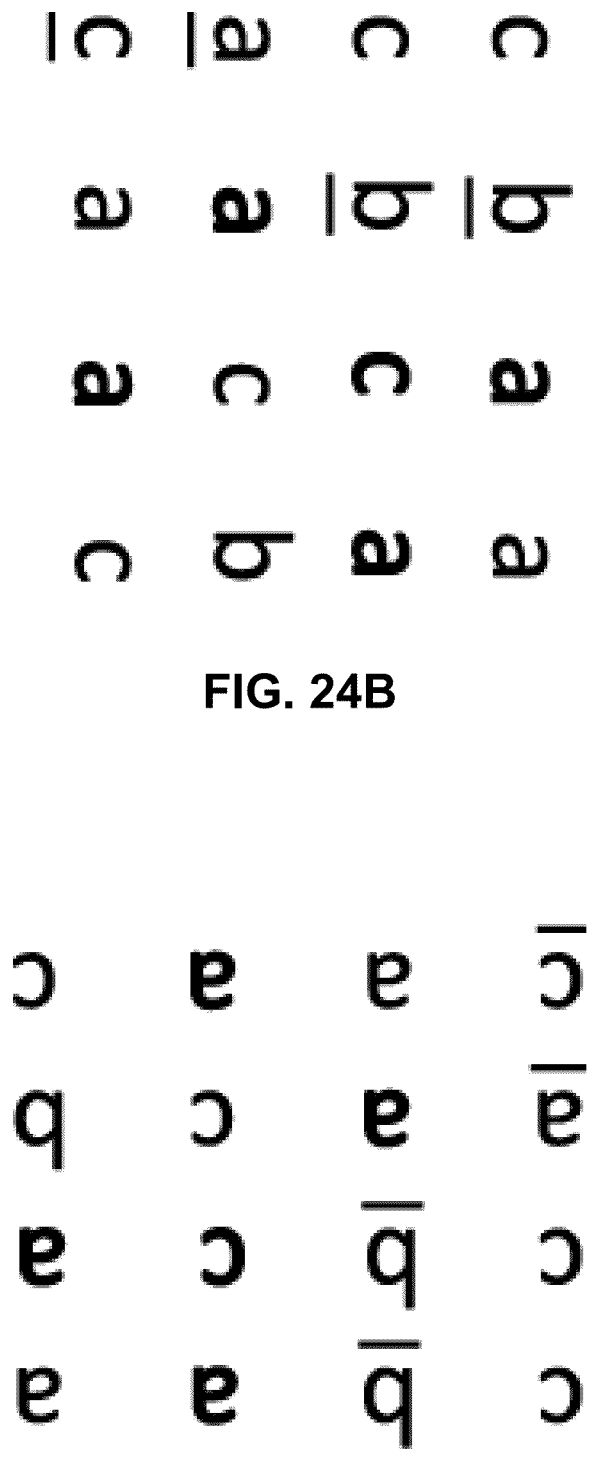
Figures 24D, 25A:
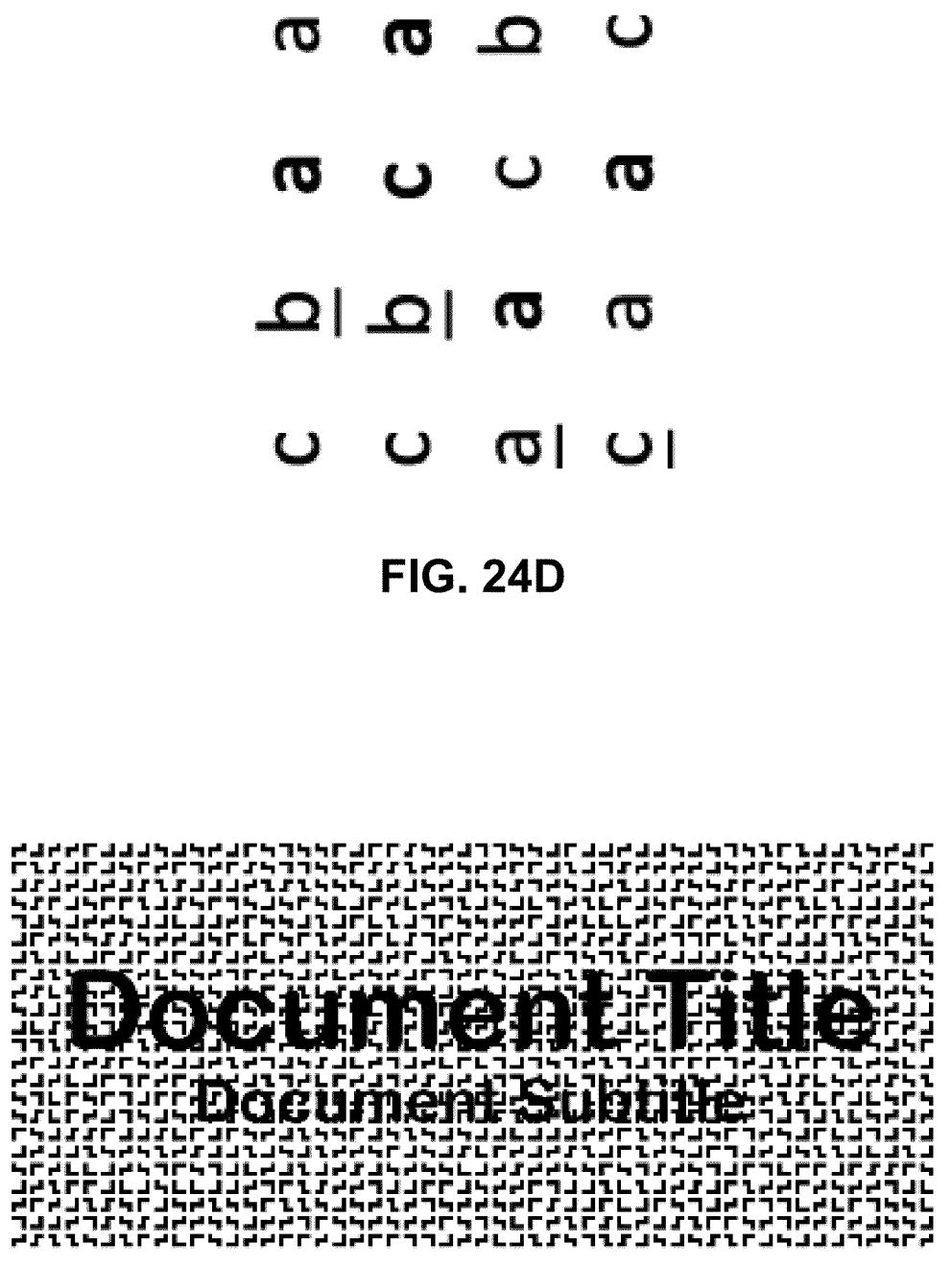

FIG. 24A shows an example of utilizing intrinsic orientation features from a set of entities to designate a valid orientation where only one orientation is valid and all others are invalid;

FIGS. 24B, 24C, and 24D demonstrate an invalid orientation of the item in 24A;

FIG. 25A demonstrates the use of utilizing intrinsic orienting features of text to designate valid orientation where only one orientation is valid and all others are invalid;

FIGS. 25B, 25C, and 25D demonstrate an invalid orientation of the item in 25A;

FIG. 26A demonstrates the use of a known subset of entities in a defined order to designate valid orientation where only one orientation is valid and all others are invalid;

FIGS. 26B, 26C, and 26D demonstrate an invalid orientation of the item in 26A;

FIG. 27A shows an example of the use of removing entities in certain locations to designate valid orientation where only one orientation is valid and all others are invalid;

FIGS. 27B, 27C, and 27D demonstrate an invalid orientation of the item in 27A;

FIG. 28A demonstrates the use of orientation marks from another element in an encoded field to designate valid orientation where only one orientation is valid and all others are invalid;

FIGS. 28B, 28C, and 28D demonstrate an invalid orientation of the item in 28A;

FIG. 29A demonstrates the use of an encoded field with intrinsic orientation to designate valid orientation where only one orientation is valid and all others are invalid;

FIGS. 29B, 29C, and 29D demonstrate an invalid orientation of the item in 29A;

FIG. 30A demonstrates an example of an encoded field with a valid orientation as a necessary prerequisite to successful authentication of a secured product;

FIGS. 30B, 30C, and 30D demonstrate a valid orientation being successfully authenticated;

FIG. 31 demonstrates the use of a camera from a laptop computer to image an encoded field from the screen of a mobile phone;

FIG. 32 demonstrates the use of a camera from a mobile phone to image an encoded field from the screen of a laptop computer;

FIG. 33 illustrates an imaging device imaging a document at an upstream and a downstream position relative thereto according to one or more embodiments disclosed herein; and FIG. 34 illustrates a system for using the imaging device according to one or more embodiments disclosed herein.

DETAILED DESCRIPTION

All publications cited below are hereby incorporated by reference in their entirety. Unless defined otherwise, all technical and scientific terms used herein will have the commonly understood meaning to one of ordinary skill in the art to which this invention pertains.

This application extends upon the disclosure provided in U.S. Provisional Application Ser. No. 61/479,380, filed Apr.

26, 2011, entitled "Product Authentication and Item Identification," the entire disclosure of which is hereby incorporated by reference in its entirety.

It must be noted that as used herein and in the appended claims, the singular forms "a," "an," and "the" include plural reference unless the context clearly dictates otherwise. Thus, for example, a reference to "a population of entities" is a reference to one or more populations of entities and includes equivalents thereof known to those skilled in the art and so forth.

As used herein, the term "entity" means a thing or composition that can exist separately or independently from other things. Examples of entities that can be used in the present invention include, but are not limited to, printed symbols of various sizes, shapes, colors, and/or intensity.

As used herein, a "cluster of entities" or a "cluster" means a classification of at least two entities that are grouped together because they share one or more discretely measurable common properties. In particular embodiments of the invention, the entities within "a cluster of entities" share one, two, three, four, five, six, seven, eight, nine, ten, or more discretely measurable common properties.

In some preferred embodiments, the entities can be printed symbols. As used herein, the term "printed symbol" means any symbology that is placed on or otherwise applied to a surface of a material. The "printed symbol" can be in any form or shape. For example, it can be dots, letters, or other visible or invisible signs. The "printed symbol" can have different shapes, such as square, circle, triangle, diamond, or any other shapes that can be distinctively measured. In certain preferred embodiments, the printed symbol set is designed such that distinctly measurable common properties are more readily determined, including, without limitation by automated image analysis methods. The "printed symbol" can also have different fonts or sizes. For example, the dots can have a size of 0.05-1 µm, 1-20 µm, 50-100 µm, or 0.1-5 mm in diameter, width, or length in the case dots are not circular. The "printed symbol" can be any printable characters selected among many alternative identities, for example, symbols or Greek alphabet characters, the Roman alphabet characters, or any other characters of any language. Further, the font size and or style of "printed symbol" could be replaced with any number of alternatives, for example, font, color, italics, striking-through, highlighting, bolding, underlining, shadowing, outlining or the like. Whole words, images, or logos may replace individual characters to be used as "printed symbols". The "printed symbol" can also be any symbols, such as those listed in Microsoft Word or any other signs.

In some embodiments, the "printed symbols" are designed to have properties that facilitate classification of printed symbol into an entity and distinct cluster of entities. Such properties include equivalent area occupied relative to one another, contiguous shape properties, maximal separability, maximal permutations of symbol type, and alignment to a specified angle.

The "printed symbol" can be placed on or applied to the surface of a material by a variety of means. For example, it can be applied to a printable surface by printing; or it can be applied to a surface by dropping, spraying, painting, rolling coating, embossing, debossing, engraving, etc. The ink used for printing may be visible or invisible to the unaided eye.

In other preferred embodiments, the "printed symbols" are image renderings, as on a computer screen or a mobile phone display. "Printed symbols" that are image renderings can be in any form or shape. For example, they can be dots, letters, or other visible signs, or be part of an invisible digital layer. "Printed symbols" that are image renderings can have some or all of the features described for "printed symbols" that are placed on or otherwise applied to a surface of a material.

As used herein, entities that are "printed symbols" that are image renderings and "printed symbols" that are placed on or otherwise applied to a surface are referred to collectively as "reference characters."

In some embodiments, the entity can be an entity that is labeled with or affixed to other entities. For example, the entity can be a symbology printed with an ink containing microparticles. Another example of such entity is a particle that is covalently or non-covalently affixed with one or more other particles. U.S. Patent Application Publication No. 2006/0054506 describes submicron-sized particles or labels that can be covalently or non-covalently affixed to entities of interest for the purpose of quantification, location, identification, tracking, and diagnosis. In some embodiments, the product can have two or more layers including entities for encoding information. For example, the product may have symbology, encoding information in a first frequency array based on the printed symbols. The product also has a second layer based on the symbology being printed with an ink containing microparticles, wherein a second frequency array is based on the microparticles in the ink.

To increase the per volume information content, the entity can be labeled with one or more tags that are visible or invisible to naked eyes. The term "tag" or "taggant" as used herein can be any composition that is suitable for the purpose of detecting or identification. The tag can be overt, covert, or invisible or otherwise difficult to detect on individual entities or small numbers of entities, yet having an overt signal detectable from all or a larger number of entities. For example, the entity can be labeled with one or more colors, fluorescent dyes, ultraviolet radiation dyes, luminescent compositions, hapten, nucleotides, polypeptides, or scents. A single entity can be labeled with more than one tag of the same or different types. For example, a particle can be labeled with two or more discretely distinguishable dyes in varying proportion; or a particle can be labeled with a nucleotide and a fluorescent dye. Any known tags and combinations of tags with entities can be used in the invention. Methods known to those skilled in the art can be used to label an entity with one or more tag. For example, U.S. Pat. No. 6,632,526 teaches methods of dyeing or staining microspheres with at least two fluorescent dyes in such a manner that intra-sample variation of dye concentrations are substantially minimized. The entity can be a segmented particle whose composition is varied along the diameter or the length of the particle. U.S. Pat. No. 6,919,009 teaches methods of manufacture of rod-shaped particles.

Additionally, microprinting is an alternative to the conventional printing used in this example. Microprinting is an anti-counterfeiting technique used most often on currency and bank checks, as well as various other items of value. Microprinting involves very small print, usually too small to read with the naked eye, onto the note or item. Microprint is frequently hidden in an inconspicuous, unnoticeable area on the note or item, but may be placed in a prominent location on the item, and may even be labeled with an "MP" symbol as a warning that the note or item contains microprinting. For example, U.S. Pat. No. 6,214,766 relates generally to a method for producing security paper that involves printing microdot images using a colorless ink containing starch, such dots to be revealed by exposure to iodine.

As used herein, a "population of entities" or a "population" means a collection of a combination or plurality of entities that include two or more distinct clusters of entities, wherein entities within one cluster have one or more discretely measurable common properties that are different from that of entities within another cluster from the same population.

As used herein, the term "relative counts of entities per cluster" means a ratio of the count of entities per cluster relative to another number. In some embodiments, the other number is the count of entities within a different cluster. In other embodiments, the other number is the total count of entities within two or more clusters of a population of entities. In other embodiments, the other number is representative of the amount or concentration of the cluster or the population of entities, such as unit volume or weight of the cluster or the population of entities. In yet other embodiments, the other number is representative of the amount or concentration of a product the cluster is associated with, or the amount or concentration of a portion or a component of the product.

As used herein, the term "a representative number of entities within a population of entities" refers to a fraction or a portion of the population of entities which contains the same clusters of entities and the same count of entities per unit of each cluster as those of the population.

As used herein, the term "blob" means any region of pixels on a digital image identified or referenced as a single unit. This region is defined by some set of parameters or an method that labels pixels. See "Machine Vision" by Snyder and Qi, ISBN-10: 052116981X, published Nov. 25, 2010, pages 181-182, which is hereby incorporated by reference.

As used herein, "a frequency array of a population of entities" is an array including information about the counts or relative counts of entities of at least two distinct clusters of entities within the population.

The existence of a frequency array for a population of entities provides a method of authenticating a product, for example a pharmaceutical product, which is easy to operate, but difficult to imitate or counterfeit. The method of authentication uses a product authentication code defined by a frequency array of a population of entities, which has high per volume information content. A product is accepted as authenticated if the measured frequency array of the product matches that which is expected.

As used herein, a "product authentication code" or "product authentication identifier" is a system or code that represents information specific to a product. The system or code is matched with a product type or batch of product of a particular type such that tracking or sampling of the code associated with the particular product or batch of products provides those designated by the source to know any of a variety of characteristics or information about the product(s). For example, a "product authentication code" for a pharmaceutical product can represent information about the product, such as the chemical composition, the concentrations of the effective ingredients, the date or place of manufacture, the source of distribution, the batch, the shelf life, or a myriad of other information designations.

A "product authentication code" establishes a product's authenticity and provides a method for tracing product in the supply chain. A "product authentication code" also addresses re-importation issues, e.g., where a product like HIV drugs are sold outside the developed world under license conditions that preclude sale of licensed products back into the developed world. It can further be used in forensic toxicology to unequivocally identify use/misuse of a product and defend against baseless liability claims, etc.

It is appreciated that the present invention encompasses a vast number of product authentication codes depending on the number of clusters and the number of counts per cluster in the frequency array. That is, varying the quantity or quality of entities within a population of entities results in a different pattern of the frequency array, thus a different product authentication code.

As used herein, an "item identifier" is a system that represents information specific to an individual instance of a product. The "item", or individual "instance" of a product, is an individual item, individual article or anything else that can be defined as an individual occurrence of a product. Individual instances or items of a product are often similar or identical, as is often the case by design between articles within a manufacturing run (i.e., a batch or lot) of a product. The item or instance can be one occurrence of a packaged end product (such as a box or sleeve of skin patches, a bottle of pills, or a box of syringes) or can be a single unit (an individual skin patch or an individual pill). There is no generic limit as to how an item or instance can be defined, as the item or instance will vary based on what the product is and what information related to the product is of interest.

The present invention provides a way to encode a product item or instance with a unique item identifier (or identifying code), thereby enabling information related to the unique code to be gathered and stored. The unique item identifier thus provides a way to capture and record transactions in which the item identifier is involved and can provide, in some circumstances, evidence of a chain of custody for the item. For example, an item identifier can be a unique linear string or other distribution of entities within a frequency array applied to a product, wherein the design of the frequency array is such that no duplication is expected or extremely infrequent duplication is expected, in the latter case with an expected frequency beyond the realm of practical likelihood. The distribution of entities may be determined in one dimension along a line or in a sequence, in two dimensions in an area, or in three dimensions in a volume. Thus, the unique spatial arrangement of entities is useful as an item identifier.

Alternatively, a unique item identifier can exist in the form of non-spatial variability in individual entities or the entire set of entities associated with an item. The application of entities to a product is inherently imperfect. For example, one cannot ensure that for a code consisting of two elements A and B with a respective ratio of 3:1 that each item receives exactly three microparticles of type A for every one microparticle of type B. This case can also apply to printed stock encoded with microprint or other printed code that is later subdivided into items. In another example, one might determine the intensity distribution within a class of entities for a given item. This distribution may differ from another item by a small but measurable amount. This error analysis is another non-spatial tool useful for item-level identification.

It will be appreciated that the population of entities can be associated with the product in a wide variety of ways. The population of entities can be present in or on all or part of the product, or in or on all or part of a label, wrapper or container associated with the product. The entities can be incorporated directly into the target product using any suitable technique.

Entities can also be incorporated on a patch, for example, a transdermal patch.

In certain further embodiments, the entities can be associated with the product by being present in or on the product container, packaging or labeling, or a combination thereof. For example, the population of entities can be applied to the inner, outer, or both inner and outer portions of a container for the pharmaceutical product. The entities can be incorporated into the container during the manufacturing process of the container, and/or the entities can be applied to the inner and/or outer portions of the container or alternatively added during fill. According to this embodiment, the container can take any appropriate form.

In specific embodiments, the entities are included in a label or an article that can be affixed to the container containing the pharmaceutical formulation. For example, where the entities are microparticles, inks containing the microparticles can be used to print the labeling directly onto the container, or printed dots can be printed directly onto the container. Alternatively, printed symbols or inks containing microparticle entities can be used to print the product authentication code onto a printable article or medium, which can be subsequently applied on a variety of interior and exterior surfaces of the product or the container of the product. In some embodiments, the printable article is adhesive Inks, printable articles or media and methods to print microparticles onto a printable article or medium are known to those skilled in the art, see for example, U.S. Pat. No. 5,450,190.

The invention also includes an article that can be affixed to a product, wherein the article includes a product authentication code of the invention.

The product authentication code of the invention can be used in combination with one or more other manners for product authentication. For example, it can be combined with a radio frequency identification (RFID) tag, spectroscopic inks, hologram, reflective paper, laser etched paper, or a bar code on the on the package, container or label of the product. It can also be combined with a molecular marker or surface/formulated dye incorporated into the product.

Another general aspect of the invention relates to a product for sale in commerce, wherein the finished product includes a product authentication code defined by a frequency array of a population of entities associated with the product, wherein the frequency array includes information about the counts or relative counts of entities of at least two distinct clusters of entities within the population. The product authentication code serves as the first unique layer in creating an item identifier. A second item feature can serve to interact with the product authentication code to produce an item identifier. In one embodiment, the product is a pharmaceutical product. In some embodiments, the pharmaceutical product item is a pill, a bottle containing medicine, or a transdermal patch.

Another general aspect of the invention relates to a product that is a document subject to authentication and identification of text and other human-readable content in documents including signatures, wherein the finished product includes a product authentication code defined by a frequency array of a population of entities associated with the product, wherein the frequency array includes information about the counts or relative counts of entities of at least two distinct clusters of entities within the population. In some embodiments, a frequency array printed on the document as a background layer serves as the first unique layer in creating an item identifier. When the document is signed, the recorded signature can serve as second item characteristic, or layer, interacting with the product authentication code to produce an item identifier. The item identifier is formed from the interaction or union of the signature with the pattern created by the frequency array.

Embodiments of the product authentication code can be any pattern or other layer applied to the document. In some embodiments, the pattern is an ordered pattern. In other embodiments, the pattern is a randomized pattern. Generally speaking, a randomized pattern makes the product authentication code more difficult to replicate, simulate, alter, transpose, or tamper with. In some embodiments, the document starting material such as document paper or a template can be purchased with one or more layers already applied or in existence. One or more layers can additionally be applied to the paper, for example to create an item identifier.

Another general aspect of the invention is a method of determining a frequency array of a population of entities, including classifying entities within the population into at least two distinct clusters of entities; determining the counts or relative counts of entities within each of the at least two distinct clusters; and combining the information about the counts or relative counts of entities of the at least two distinct clusters in an array. The population of entities can be associated with a product or exist separately from the product. When the population of entities is associated with the product, it can be either incorporated into the product or associated with the package, container or label of the product. In some embodiments, the frequency array serves as a first layer in authenticating the product and/or creating an item identifier for the product.

In some embodiments, the frequency array serves as a unique first layer in creating an item identifier. In some embodiments, the frequency array serves as a first layer that is identical in all instances of an item. An item characteristic can serve as a second layer to interact with the frequency array to produce an item identifier. If the frequency array is a unique first layer in each instance of an item, an identical item characteristic can be used for all items in a group, lot or batch, as the interaction of the frequency array and the item characteristic will provide a unique item identifier. If the frequency array is identical in all instances of an item, a second layer can be used to provide a unique item characteristic useful as an item identifier as the interaction of the frequency array and the item characteristic will still provide a unique item identifier Depending on the pre-definition or the coding information for the frequency array, the array can be detected by measuring the one or more discretely measurable properties of each and all entities within the population of entities, a representative number of entities within the population, or a specific set of one or more clusters of entities within the population.

The discretely measurable properties of the entities can be measured by many methods. For example, an image of a labeled item can record many optical properties of the entities. These optical properties include size, shape, texture, color, intensity, and orientation. Additional properties can be inferred from the optical properties of entities, such as mass, density, centroid, chemical composition, and chemical reactivity, among many others. Other properties measurable using non-optical sensors include radioactivity, thermal emission, conductivity, magnetic susceptibility, etc. For those skilled in the art, property measurement is achieved by using an appropriate sensor type with the appropriately scaled sensitivity and dynamic range tailored to the properties to be measured.

One aspect disclosed herein is a method of authenticating and identifying a product, including associating a population of entities with the product, wherein the population includes at least two distinct clusters of entities having detectable counts or relative counts of entities per cluster; assigning a frequency array of the population of entities to the product as a product authentication code, wherein the frequency array includes information about the counts or relative counts of entities of at least two distinct clusters of entities within the population; wherein information about the frequency array and the product authentication code is recorded; analyzing the spatial distribution of entities in the frequency array with an item characteristic; and identifying an individual item of said authenticated product based upon the said distribution.

Another aspect disclosed herein is a method of authenticating and identifying a product, including associating a population of entities with the product, wherein the population includes at least two distinct clusters of entities having detectable counts or relative counts of entities per cluster; assigning a frequency array of the population of entities to the product as a product authentication code, wherein the frequency array includes information about the counts or relative counts of entities of at least two distinct clusters of entities within the population; wherein information about the frequency array and the product authentication code is recorded; analyzing the interaction of the frequency array with an item characteristic; and identifying an individual item of said authenticated product based on the interaction between the frequency array and the item characteristic.

The authentication methods disclosed herein begin with marking a product with a product authentication code of the present invention. The information associated with the product authentication code and the information about the particular frequency array that encodes the product identification code is recorded. Based on the recorded information, an authorized person would expect to find a certain frequency array based on certain product information, or certain product information based on the detection of a certain frequency array associated with the product. To confirm whether a product in commerce is authentic, an authorized person, based on knowledge from the record, will readily know what particular frequency array is expected to be detected from the product. After determining the frequency array associated with the product using methods described supra, the authorized person will compare the measured frequency array with what is expected based on the recorded information. A match of the measured frequency array with that which is expected, taking into account the experimental errors of the measurements, indicates that the product in commerce is authentic.

The experimental errors of the measurement can result in uncertainty about whether the measured frequency array indeed matches that which is expected. To increase the level of confidence, multiple frequency arrays may be associated with a single product at different portions of the product to allow multiple measurements and comparisons of the measured frequency arrays with that which is expected. The multiple frequency arrays can be identical or distinct.

In some embodiments, the authentication code is created in such a way that differences in the specific manifestation of the code between individual instances of a product occur while the measured and expected characteristics of the frequency array are preserved. The differences in the specific manifestation of the code provide a unique identifier for an individual instance of the product. Thus, in some embodiments, the method of identifying a product item includes recording the specifics of the frequency array to deduce the identification code of the individual instance of the product. The specifics noted can include position, layout, sequence, or other two- or three-dimensional aspects of the population of entities making up the frequency array of the authentication code as it is manifested in the individual instance of the product item.

In some embodiments, articles, items or individual instances of a product each labeled with a frequency array will each have a unique pattern or code of the manifestation of the frequency array on the product. Therefore, with one application, a single product authentication code can be used to authenticate a group of individual instances of a product at, for example, the batch level or lot level, and the unique arrangement of cluster entities can be used to identify items at the unit, or individual instance, level. An item can therefore either be authenticated, identified, or both authenticated and identified, according to aspects of the present invention.

In some embodiments the authentication code is created in a way that requires a specific orientation. In such embodiments, authentication can be coupled with an orienting layer consisting of orientation characteristics such as but not limited to orientation marks. An item with orientation marks and a unique pattern code can only be authenticated in one orientation, all others result invalid. In certain embodiments, the orientation provides information about the unique instance of the product.

One aspect is a method of utilizing product authentication codes as user validation credentials. In the event a user desires to login to a secure system or computing environment, a user could utilize the authentication of an instance of a product security code to login. This can occur via imaging of a security code from a screen and validated on a mobile device or a two way authentication where the authentication codes from a mobile device and a separate screen have to match in validation.

One aspect is the method of locating the position of entities in a layer for the purposes of determining interaction information between layers. In some cases, interaction data are assumed to occur in an approximately regular pattern. Given the pattern to which the data is expected to conform, the method tries to fit the data to that pattern.

In some embodiments, the interaction data is stored in a remote information storage system such as a transactional database. In other embodiments of the invention the interaction data is stored on the document itself.

A method of authenticating and identifying a product is disclosed herein. The method may include receiving an image that includes a product authentication identifier. The project authentication identifier may include a field including any of the collection of entities disclosed herein. The method may further include identifying the product authentication identifier. The product authentication identifier may include one or more reference characters. The one or more reference characters may include the entities and shapes disclosed herein, such as, in just one example, those entities illustrated in FIG. 21. The method may further include providing the one or more reference characters on a predetermined arrangement map, which may also be described herein as a grid. The method may further include comparing the predetermined arrangement map with an arrangement map that matches a true authentication identifier, where the true authentication identifier includes a known entity or grouping of entities or blobs that are known to be untampered with. The method may further include determining whether the image has been altered based on the comparison of the predetermined arrangement map with the true authentication identifier.

As used herein, true authentication identifier refers to an authentication identifier or field including any of the collection of entities where the identifiers are known to be untampered with.

One or more methods for authenticating a product are disclosed herein, with the following examples being illustrative of the one or more embodiments disclosed herein. As used herein, computer-implemented methods which are at least partially described with reference to FIGS. 1, 2, 12, 13, 14A, and 15 may be carried out on any appropriately configured computer device or platform, such as, for example, the platform 1600 described in FIG. 16. The computer device may include memory and computer controlled code thereon configured for carrying out the one or more methods disclosed herein. The computing device may include an imaging and/or scanning device and may further include or be operably coupled with a printing or marking device.

The image contained on the product may be one or more of a digital, printed, or displayed image. The image may be one of a prescription, document, academic transcript, package, label, hangtag, or other object.

In these one or more embodiments, the reference characters and/or entities may be placed onto the image in random positional sequence and at a fixed frequency, at random positional sequence and a random frequency, at a random position and at a fixed frequency, and at a random position and a random frequency.

Example 1

Method of Fitting Data to a Regular Pattern

In this example a computer-implemented method 100, described in FIG. 1, uses input data to fit the data to a pattern. In an embodiment, the computer-implemented method assumes the input data occurs in an approximately regular pattern, and, given the pattern the data is expected to conform to, tries to fit the data to that pattern.

The computer-implemented method first picks an initial element, and then uses the initial element to select nearby elements that are most likely an element in a predetermined direction from the initial element. For example, using a rectangular grid in this example, the computer-implemented method would select an initial element, and that initial element would be used to select secondary elements that are most likely the next element in each of the four directions (up, down, left, and right) from the initial element. After the directions have been selected, the computer-implemented method evaluates each of the secondary elements and uses the secondary elements to select tertiary elements in each direction as well. This is done until every element has been used to select elements. After this process, the set of elements can be traversed as a grid and converted to a gridded representation.

Turning now to FIG. 1, a method 100 of fitting entities to a regular pattern is provided, in accordance with an embodiment of the invention. In some embodiments, the method 100 includes receiving a set of entities that have position information and information about the shape of a grid to which the set of entities are expected to conform 102, initializing a list in which to store the entities, selecting a starting entity and storing the starting entity in the initialized list 104, selecting additional entities from the set and assigning each of the additional entities a direction relative to the entity being evaluated, and inserting the entities which have been assigned directions into the list. As used herein in each of the examples provided, grid may also be referred to as a predetermined arrangement map and may be any appropriate configuration and is not so limited as to only a square or rectangular arrangement.

The following list of steps is an exemplary sequence of the method 100:
STEP 1: The computer-implemented method receives a set of entities 102 that have position information and information about the shape of a grid to which the set of entities are expected to conform.
STEP 2: Given the entities the computer-implemented method received in STEP 1, a list is initialized in which to store the entities.
STEP 3: From the received set of entities received in STEP 1, the computer-implemented method selects a starting entity 104 and stores it in the list initialized in STEP 2 106.
STEP 4: For each entity in the list initialized in STEP 2 the computer-implemented method selects additional entities 108 from the set received in STEP 1 and assigns each of the additional entities a direction relative to the entity being operated on 110. All of the entities to which directions have been assigned are then inserted into the list 112 initialized in STEP 2.

Turning now to FIG. 2, a method 200 of fitting entities to a grid or predetermined arrangement is provided, in accordance with an embodiment of the invention. In some embodiments, the method 200 includes receiving a set of entities having positional information 202. In some embodiments, the entities also include an uninitialized link to the next closest entity in each direction, an initially empty list of votes for the location of the entity in the grid, a list of the closest entities which initially includes all entities in the set, and/or an uninitialized score indicating how well the entity fits in the grid. The method 200 further includes selecting a set of closest entities, such as via distance measurements (e.g., L2-Norm measurement of distance or the like). The method 200 further includes using the closest entities to calculate a grid fit score. In some embodiments, the method also includes inserting an entity (blob) that represents the best starting point into a data structure. In some embodiments, the best starting point is determined based on the grid fit score and/or a priority queue. The method initializes a list to store votes regarding an entities position in the grid, assigns an initial starting position to the first entity, tallies the votes for each entity in the list, and each of the closest entities is assigned a direction. In some embodiments, one or more entities are excluded based on specific criteria such that each entity is assigned only one additional entity in each direction of interest. The entities around the entity of interest are then assigned to the gird until some predetermined condition is met. The following list of steps is an exemplary sequence of the method 200:
STEP 1: First a set of entities (blobs) with positional information is received by the computer-implemented method 202. Each of these blobs also contains an uninitialized link to the next closest blob in each direction, an initially empty list of votes for the location of the blob in the grid, a list of the closest blobs which initially includes all blobs in the set, and an uninitialized score indicating how well the blob fits in the grid.
STEP 2: For each blob selected 204 in the set, the computer-implemented method selects a set of closest blobs 206 in order to reduce computational complexity. In one implementation this set is of size 8 as seen in FIG. 5 and the closest blobs are determined by calculating the L2-Norm measurement of distance between pairs of blobs
STEP 3: For each blob in the set the computer-implemented method uses the closest blobs found in STEP 2 to calculate a "Grid Fit Score" 208, which is a metric that defines how well a blob fits into a certain grid. In one implementation the "Grid Fit Score" is calculated by the following equation: abs(Top[x]−Current[x])+abs(Bottom[x]−Current[x])+abs(Left[y]−Current[y])+abs(Right[y]−Current[y]), where Top, Bottom, Left, and Right are blobs assigned to those directions relative to the Current blob, and abs is the absolute value function.
STEP 4: Next the computer-implemented method initializes a data structure in which to store blobs and based off the "Grid Fit Score" the computer-implemented method inserts a blob that represents the best starting point 210. In one implementation the data structure is a Priority queue which is sorted first by the number of votes on the grid position that each element of the priority queue has received and then by the "Grid Fit Score." In one implementation a version of Insertion Sort is used to sort the Priority Queue. In one implementation the blob inserted first is the one with the lowest "Grid Fit Score" where lowest indicates best fitment into a grid.
STEP 5: For each blob, a list is initialized to store votes regarding its position in the grid.

STEP 6: For the first blob inserted into the data structure in STEP 4, the computer-implemented method assigns an initial vote to that blob that sets the effective starting position of the grid 212. In one implementation the vote assigned to the first blob is for position (0,0) on a 2-D grid STEP 7: For each blob in the data structure, the positional votes on that blob are tallied 214. If the votes result in a different grid position, then that blob's position is updated 216. In one implementation the tally of votes is determined by a simple majority of votes, with the 'Grid Fit Score' used as a tiebreaker. Further ties are broken based on order of votes STEP 8: For each blob in the set of closest blobs to the blob operated on in STEP 7 (current blob) 218 a potential direction is assigned indicating the relative position of each closest blob to the current blob 220. In one implementation the directions of interest are up, down, left, and right STEP 9: One or more blobs in the set of closest blobs assigned a direction relative to the current blob are filtered out of the directional assignment if the blobs do not fit some pre-specified criteria for that direction 222. This results in at most one blob for each direction relative to the current blob. In one implementation the filtering criteria are: only looking at the four closest blobs representing one in each direction; filtering a blob if it is not on the correct side of the current blob (e.g. a blob labeled as Left has an x-coordinate less than the current blob); filtering a blob if it isn't in the extreme position in that direction (e.g. it will not be set as the blob on the Right unless it has the greatest x-coordinate value of any other blobs potentially to the right of the current blob); and a blob is filtered if it is labeled inconsistently (e.g. the Blob is marked as bottom, up, and down.)

STEP 10: For each remaining blob after STEP 9, a vote is cast on the location of that blob relative to the current blob 224 and then the blob is inserted into the data structure 226.

STEP 11: Return to STEP 6 and repeat until a stopping condition is reached. In one implementation the stopping condition is the completion of gridding 75% or more of all blobs or there are no blobs left ungridded.

Turning now to FIG. 3, an example of a field to be fit to a grid is provided. In this embodiment, a rectangular grid formed of contiguous rectangular shapes is provided (labeled entities). In FIG. 4, a detail of a "working area" of the gridding method described in FIG. 2 is provided. The working area is a close-up of the grid disclosed in FIG. 3, and includes 25 elements formed of contiguous rectangles. In FIG. 5, a detail of a field 500 having a boxed area 502 that represents the set of closest blobs to a selected blob 504 is provided.

In FIG. 6, an example of the relationship between the set of closest blobs to the selected blob is provided. In an embodiment, the relationships disclosed in FIG. 6 are the results of STEP 2 of the gridding method described in Example 1. The dots are the centers of the blobs they are closest to, and the dark lines represent the relationships between the blobs as established by the computer-implemented method. The line extending from the center to the right-most blob is the relationship for the 'right' direction, and similarly the other visual directions correspond to the logical directions.

Turning now to FIG. 7, an example of the relationship between the second iteration set of closest blobs is provided. In an embodiment, the relationships depict the results of a second iteration of STEP 2 in the gridding method described in Example 1. At the point represented in this image the gray dots represent blobs marked in the previous iteration, the gray lines represent the previous relationships, and the black elements are the current elements with the same meaning as the ones in FIG. 6. In this example, there are three blobs in the priority queue (the gray blobs in this image), and two blobs that have been processed 702 and 704 (the center blob in this image 704, and the previous center blob 702).

A method of authenticating a document is encompassed herein. The method includes receiving a document to be authenticated, analyzing the document to create a signature, comparing the signature with a reference signature from an authentic document associated with the signature, and determining the document to be authenticated as authentic based on the comparison. In one or more embodiments, the method may further include not comparing the document to be authenticated to a copy of the authentic document.

In one or more embodiments, a method of fitting entities to a grid or a predetermined arrangement is provided. The method includes receiving a set of entities, related position information, and a grid structure, initializing a data structure for storing entities, inserting a first entity into the data structure, determining a position of other entities in the grid structure relative to a currently evaluated entity, assigning a potential direction to the other entities relative to the currently evaluated entity, inserting each other entity into the data structure, and determining the grid location for each entity. In one or more embodiments, each entity may include an uninitialized link to the next closest entity in each direction, an initially empty list of votes for the location of the entity in the grid, a list of the closest entity which initially includes all of the entities in the set, and an uninitialized score indicating how well the entity fits in the grid. In one or more embodiments, the method may include selecting a set of entities closest to the entity currently being operated upon. In one or more embodiments, the selection of the starting element is based upon a metric. In one or more embodiments, the data structure for storing entities is further based on a priority queue. In one or more embodiments, the potential directions are up, down, left, and right. In one or more embodiments, the method may include filtering out entities that do not meet pre-defined criteria. In one or more embodiments, the metric is a grid fit score. In one or more embodiments, the pre-defined criteria include at least one of being one of the four closest entities to the current entity, being correctly positioned relative to a positional label, being in an extreme position for the assigned direction, and having a consistent positional label.

Example 2

Unique Attributes of Symbol Sets to Optimize Fraud Detection and Item Identification Example 2 describes how certain printed symbols are used to carry an authentication code and comprise a frequency array, provided the symbols are analytically distinct one from another. Depending on the implementation mode it is beneficial to design symbol sets to an optimized configuration.

FIG. 8 and FIG. 9 illustrate examples of symbol sets designed to an optimized configuration. FIG. 8 provides an example of a rectangularly-oriented eight shape set. Note the contiguous rectangles forming the shapes. FIG. 9 provides an example of a hexagonally-oriented sixteen shape set. Note the contiguous hexagons for the shapes.

In an embodiment, the printed symbols are designed to comply with up to five primary features enabling an optimal symbol set: (FEATURE 1) all of the shapes in each set are approximately equivalent in terms of the area they occupy and in terms of color, intensity, or hue; (FEATURE 2) all of the shapes are approximately contiguous; (FEATURE 3) the shapes are separable relative to one another; (FEATURE 4) the shape configuration delivers a usefully large number of discreet shapes; and (FEATURE 5) the shapes are aligned or closely aligned to a particular axis. In an embodiment, the printed symbols comply with all five primary features. In further embodiments, the printed symbols comply with at least one, at least two, at least three, or at least four of the primary features. In one or more embodiments, at least eight different shapes form the set of shapes. The shapes may be aligned or closely aligned to a particular axis.

With respect to FEATURE 1, in certain embodiments, all of the shapes in each set are approximately equivalent in terms of the area they occupy. The shapes are also all equivalent in terms of color, intensity, or hue. As a result, the shapes provide a relatively uniform color when viewed at a distance and create a relatively nonintrusive background to additional layers placed above the shape layer. FIG. 10 provides an example of eight rectangularly-oriented shapes occupying a substantially equivalent area. FIG. 11 provides an example of sixteen hexagonally-oriented shapes occupying a substantially equivalent area.

With respect to FEATURE 2, in some embodiments all of the elements of the shapes should be approximately contiguous. Typically, all elements of each shape should be connected or close to connected resulting in no disjointed areas within a single shape. This enables shapes to be more easily detected by blob-detect methods. Also small breaks in a shape either intentionally introduced or due to variations in manufacturing process such as printing and scanning can be more easily be addressed in computer-implemented methods. FIGS. 10 and 11 also provide examples of shapes formed by contiguous elements, e.g., rectangles or hexagons, respectively.

With respect to FEATURE 3, in some embodiments the shapes should be separable relative to one another. In some embodiments, the combination of FEATURE 1 and FEATURE 2 and the actual design makes the shapes are easily separable one from another. By making the shapes separable, the shapes are more readily distinguished one from another and the correct shape may be identified and classified.

Turning now to FEATURE 4, in some embodiments the shape configuration should deliver a usefully large number of discreet shapes. This creates the largest flexibility in statistical code construction. It also enables better capability to measure and analyze interaction between two or more layers to create unique item identification and for effective fraud detection by enabling a large amount of differentiation. A large number of shapes also enable the creation of a much greater number of complex authentication codes.

With respect to FEATURE 5, in some embodiments the shapes should be aligned or closely aligned to a particular axis. This enables a correction of an item of interest with regards to rotation up to 45 degrees from an axis of interest. For example, for the shapes described in FIG. 8 a document that contains these shapes and is scanned with an undesired rotation can be corrected for up to 45 degrees of rotation.

It should be understood that other features or limitations for shapes may be determined based on the general schematics for shapes disclosed herein.

Example 3

Method of Calculating Interaction Between Two Layers

Example 3 describes a method of comparing a set of base images to a target image to get a signature for that target image. In one embodiment, a computer-implemented method makes a comparison by identifying the target image and selecting a set of source images. The computer-implemented method then calculates the difference between each source image and the target image. The computer-implemented method then reduces this difference to a single error value and stores the single error value into a list. This list then becomes an error vector and can be stored for retrieval later. In some embodiments, this list is associated with a product, such as a document, that may be authenticated at a later date. In an exemplary embodiment, the list is stored in association with the product identifier, but the document itself is not stored.

Turning now to FIG. 12, a method of calculating interaction between two layers 1200 is provided, in accordance with an embodiment of the invention. In an embodiment, the layers are a source image and a target image.

STEP 1: The computer-implemented method selects a source image including a set of shapes 1202. In an embodiment, this image is of equal size and should be maximally separable. For the current example, a set of connected shapes that could be reduced to a 3×3 binary array was used.

STEP 2: The computer-implemented method chooses a target image 1204. This image can be a sub image of another image or a composition of a number of images. For this implementation, an image was selected that is a multiple of 3 in width and height. This is done for ease of computation in the next step. The computer-implemented method also selects a source image 1208.

STEP 3: The computer-implemented method scales the target image to be the same size as the source images 1206. For this implementation the target image was reduced to a 3×3 grid with each location representing the percentage of the original image in the proper area that was colored in.

STEP 4: Each image in the set of source images is compared to the target image to get a similarity score 1210. This is done in the current implementation by comparing the percentages calculated in the 3×3 grid to the 3×3 binary array representations of the source images. Each of these scores are added to a list which, when filled, becomes the error vector 1218.

In one or more embodiments, the computer-implemented method 1200 may further include the following steps useful in determining the error vector 1218: adding the calculated difference found in 1210 to the total error 1212; and adding the total difference to the error vector 1214. The computer-implemented method 1200 may further include determining whether all source images have been compared to the target image 1216.

Example 4

Method of Calculating Differences Between Items of Interest

Example 4 describes a method for finding a fit between an arbitrary image and the target used to create the signature demonstrated in EXAMPLE 3 by calculating the error vector as in EXAMPLE 3, but using the arbitrary image to test as the new target. This will produce another error vector, and by calculating the similarity between the two error vectors, the computer-implemented method can determine similarity between the original target image and the new arbitrary target image. In an embodiment, the arbitrary target image is allegedly the product of interest but may have been manipulated and thus is being authenticated according to the method.

Turning now to FIG. 13, a method 1300 of calculating differences between items of interest is provided, in accordance with an embodiment of the invention.

STEP 1: The computer-implemented method selects a signature to compare a location against, and then selects the shapes used to create that signature.

STEP 2: The computer-implemented method selects a reference image to compare with the image the signature was generated from. In an embodiment, the two images are compared by comparing their signatures.

STEP 3: The computer-implemented method calculates the signature for the test image using the same method as in 'Create Signature' above. In an embodiment, this is done using the same source shapes, but the target image should be the test image for this case.

STEP 4: Given the two signature vectors, the computer-implemented method compares them by going element by element and calculating the difference between error vectors at each location in vector 1316. In some embodiments, the method sums the result of the errors to get a total error vector. This error result is representative of the similarity between the two target images. The lower the error, the more similar the two images are determined to be. An error of zero indicates an almost exact match.

The method 1300 may include using the stored error vector 1302, comparing the new error vector to the stored error vector 1304 by building upon determining whether all source images have been compared to a target image 1216 in method 1200. The computer-implemented method 1300 may include calculating the difference between the error vectors at each location in the respective vectors 1306. The method 1300 may include adding the difference found in 1306 to the total error 1308. The method 1300 may further include returning the total error 1310.

Example 5

Method of Creating a Self-Authenticating Document

Example 5 illustrates a process for creating a document that is able to detect changes in itself by having a stored digital signature of the document on the document itself.

In an embodiment, the process by which a self-authenticating document is created is by encoding a digital signature of the document on the document itself. First, a document with defined space where a digitally readable mark would go is created. The document is then scanned and compressed into a digital representation. This representation is then written to the document in a form that can be read by validation software.

FIG. 14A provides an example of a method of creating a self-authenticating document, in accordance with an embodiment of the invention. In one embodiment, to create this document, a computer-implemented system receives a document that has a border of space or other whitespace around the sensitive data 1402. In some embodiments, this border would be approximately 2.5 inches wide on the top and bottom and 1.5 inches wide on the sides. It should be understood that borders of varying sizes, orientations, and shapes may be used. Border does not necessarily require defining the outermost perimeter of the object, in this example a document, and may be defined about an inner portion or perimeter of the object. In these one or more embodiments, the authentication identifier is not placed onto the body of the image.

Next, the computer-implemented method 1400 processes the document and creates a digital representation 1404. In processing, the computer-implemented method may align the document by placing a fake selection of code elements in the space border. The processing of the document uses these fake elements to align the document and select points of interest inside this newly placed border of elements. For each of the interest points, the computer-implemented method creates, as described in Example 3, a signature of that location of the document.

Once a signature for each location on the inside of the border is determined, the computer-implemented method encodes this digitally. This digital representation is then converted to a visible mark 1406 by encoding the digital representation in the printed mark which replaces the fake selection of code elements with elements that contain the digitally encoded data. This data may be encrypted, compressed or transformed in some way. This pattern is then added to the document and a protected document is produced 1408 by writing the printed mark to the document in the whitespace.

FIG. 14B illustrates one example of a document 1420 having a whitespace 1422 and FIG. 14C illustrates one example where the document 1420 of FIG. 14B has been authenticated with a printed authentication visible mark 1424 according to the one or more methods 1400 illustrated in and described in regards to FIG. 14A. Additionally, as illustrated in FIGS. 14B and 14C, the document 1420 may include a QR or other identifying code 1426 and additional information 1428 may be provided in the printed space of the document 1420.

Example 6

Validation of a Self-Authenticating Document

Example 6 describes a process to validate a document that is able to detect changes in itself by having a stored digital signature of the document on the document itself.

Beginning with a document generated as described in Example 5, the computer-implemented method reads the security mark, decodes it, and processes the document on the corresponding document. Then, the computer-implemented method compares the document it is attached to with the encoded document and returns information about the authenticity of the document.

FIG. 15 illustrates an example of a method 1500 of validating a self-authenticating document, in accordance with an embodiment of the invention. In an embodiment, the method 1500 receives a self-authenticating document 1502. For validating a document secured with the process of this example, the computer-implemented method detects the set of alignment marks. The computer-implemented method then reads the data from the alignment marks and reconstructs the digital signature of the document 1504. The computer-implemented method 1500 then, as in Example 5, processes the document and create a digital signature of the document 1506. The digital signature is then compared to the digital signature stored in memory 1508, and a list of errors is produced for each location in the document. The computer-implemented method then determines the code elements and aligns the document to its approximate location of when it was encoded. The computer-implemented method then reads the data from the elements and generates a pattern in memory to compare this document to. The computer-implemented method then processes this document and collects a list of pattern elements. This set of pattern elements is compared to the list stored in memory, and a list of errors is produced for each location in the document. For each of the elements in this list the computer-implemented method marks that element as changed or not based on how similar it is to the corresponding element stored in the document code. From this changed data, the computer-implemented method makes a determination of whether a document is altered or authentic 1510.

In these one or more methods, the method may include receiving a document, adding alignment marks to the document, creating a digital signature of the document, converting the digital signature into a visible mark, and adding the visible mark to the document.

In these one or more methods, a method may include receiving an encoded document, reading a security mark on the encoded document, extracting a stored digital signature of the document from the security mark, processing the document to create a digital signature, comparing the digital signature to the stored digital signature, and authenticating the encoded document based on the comparison.

It will be appreciated that in some embodiments of this Example 6, the process occurs locally on a device capable of both imaging and computer calculation, using for example a mobile camera phone or a laptop computer having a camera.

Additional Methods

FIG. 16 provides a block diagram illustrating technical components for a system 1600 for authenticating a product, in accordance with an embodiment of the present invention. As illustrated, in some embodiments the system includes a computer platform 1620 in an environment 1600 that includes a product to be authenticated 1610, a product input device 1630, a user 1650, and/or a network 1640. The product input device 1630 may be any device that is capable of inputting an authentic or questionable item to the computer platform 1620. For example, the product input device 1630 may be a scanner, a camera, a video device, or the like.

In an embodiment, the product 1610 is a document or other item that is known to be authentic or is being tested for authenticity, as disclosed herein. In an embodiment, the document is associated with a signature, such as having the signature attached to the document or by being associated with the signature via a database. The product may include text, numbers, and/or symbols.

As shown in FIG. 16, the computer platform 1620 is operatively and selectively connected to the network 1640, which may include one or more separate networks. In addition, the network 1640 may include a local area network (LAN), a wide area network (WAN), and/or a global area network (GAN), such as the Internet. It will also be understood that the network 1640 may be secure and/or unsecure and may also include wireless and/or wireline technology.

In some embodiments, the computer platform 1620 includes any computerized apparatus that can be configured to perform any one or more of the functions described and/or contemplated herein. In accordance with some embodiments, for example, the computer platform 1620 may include an engine, a platform, a server, a database system, a front end system, a back end system, a personal computer system, and/or the like. In some embodiments, the computer platform 1620 includes a communication interface 1622, a processor 1624 and a memory 1626. In some embodiments, as illustrated in FIG. 5, layer data (such as layers associated with signatures for layers that were previously created based on known authentic documents) 1627, a decision engine 1628 (for comparing products to be authenticated to stored layers), and a layer creation routine 1629 (for creating layers for known authentic and questionable products) may be stored in memory 1626. The layer data 1627 may have been previously collected and stored in the memory 1626 of the computer platform 1620, or the computer platform may actively collect layer data 1627 by using the communication interface 1622 to access the network 1640 and only temporarily saves the layer data 1627 to the memory to be accessed by the processor 1624. The communication interface 1622 is operatively and selectively connected to the processor 1624, which is operatively and selectively connected to the memory 1626.

Each communication interface described herein generally includes hardware, and, in some instances, software, that enables a portion of the computer platform 1620, such as the processor 1624 to transport, send, receive, and/or otherwise communicate information. For example, the communication interface of the computer platform 1620 may include a modem, server, electrical connection, and/or other electronic device that operatively connects the computer platform to another electronic device, such as the product input device 1630.

Each processor described herein, including the processor 1624 generally includes circuitry for implementing the audio, visual, and/or logic functions of that portion of the computer platform 1620. For example, the processor may include a digital signal processor device, a microprocessor device, and various analog-to-digital converters, digital-to-analog converters, and other support circuits. Control and signal processing functions of the system in which the processor resides may be allocated between these devices according to their respective capabilities. The processor may also include functionality to operate one or more software programs based at least partially on computer-executable program code portions thereof, which may be stored, for example, in a memory device, such as the memory 1626.

Each memory device described herein, including the memory 1626 for storing the data and/or programs, may include any computer-readable medium. For example, memory may include volatile memory, such as volatile random access memory (RAM) having a cache area for the temporary storage of data. Memory may also include non-volatile memory, which may be embedded and/or may be removable. The non-volatile memory may additionally or alternatively include an EEPROM, flash memory, and/or the like. The memory may store any one or more of pieces of information and data used by the system in which it resides to implement the functions of that system.

It will be understood that the computer platform 1620 can be configured to implement one or more portions of the process flows described and/or contemplated herein. For example, in some embodiments, the computer platform 1620 is configured so that the processor authenticates a product based on comparison of an image to a reference image. The reference image may be a set of shapes. The set of shapes may be approximately equivalent. The shapes may be separable relative to one another.

It will be understood that the one or more embodiments illustrated in FIG. 5 is exemplary and that other embodiments may vary. For example, in some embodiments, some or all of the portions of the computer platform 1620 may be combined into a single device. Specifically, in some embodiments, the computer platform 1620 is configured to perform all of the same functions of those separate portions as described and/or contemplated herein. Likewise, in some embodiments, some or all of the portions of the computer platform 1620 may be separated into two or more distinct devices.

Example 7

FIG. 17 illustrates a general process flow of a computer-implemented method 1700 for analyzing an image comprising a frequency array, in accordance with an embodiment of the invention. In block 1705, the system receives data. For example, the system may receive image data (Image) and program parameters (Parameters) from Web Service. It should be understood that other applications may deliver the image data, for example and without limitation, an image may be captured from the system executing the software by means of a camera, scanner, or other image capture device.

In block 1710, in some embodiments the system removes noise from the image in preparation for classifying objects within the image. For example, the system may:
1. Resize Image based on Parameters such that the shapes contained within the Image are similar in size to Reference Shapes.
2. Blur Image to reduce high frequency noise.
3. Apply a Difference Of Gaussian operation on the image in such a way as to enhance shapes and minimize noise. See, for example, Lowe, David. G., *Distinctive Image Features from Scale Invariant Keypoints*, accepted for publication in International Journal of Computer Vision, Jan. 5, 2004, available online at http://www.cs.ubc.ca/~lowe/papers/ijcv04.pdf.
NOTE: The Difference Of Gaussian operator can cause various results based upon the numerical kernels used within its convolution. In the illustrated embodiment, a 3×3 and a 9×9 kernel was used but it should be understood that other kernel sizes may also be used.
4. Blur the Image to enhance uniformity in similar areas of Image.
5. Apply Threshold to Image to separate foreground from background.

In block 1715, the systems find blobs along with their characteristics in the Image. In some embodiments, this information will be for image rotation correction. The system may count the number of blobs in the image and save the data in a data structure (Original Set). Using the Original Set, the system finds the mode blob size (height and width) and saves this information to a variable (Shape Size).

In block 1720, the system finds the rotation of the image and, in some embodiments, corrects for any offset. In an exemplary embodiment, the system finds the rotation offset of the image from a perfect upright position and saves this to a variable (Angle). Other methods of find the grid may also be used. For example, the system may find corner shapes and interpolate or may find distances from every shape to every other shape. In some embodiments, the system corrects the rotation of the image by using the Angle+2 degrees such that the image is now 2 degrees rotated counter clockwise from an upright position. The 2 degree counter-clockwise rotation is necessary for the Hough transform (discussed later) to work properly.

In block 1725, the system finds blobs along with their characteristics in the image. This information will be utilized to classify the blobs within the image. In an embodiment, the system counts the number of blobs in the image and saves the data in a data structure (New Set). Using the new set, the system finds the mode blob size (height and width) and saves this information to a variable (New Shape Size).

In block 1730, the system initializes a set of shapes that will be used for comparison when classifying blobs in the image. In some embodiments, the system generates the reference shapes and places them in memory.

In block 1735, the system classifies the blobs in the image. In an embodiment, the system classifies the blobs in the image using the reference shapes and the new shape size and saves this classification data inside the new set data structure. The classification algorithm expands the blob to a multiple of the reference shape size and then reduces this blob to the same size as the reference shape size.

In block 1740, the system finds data necessary to arrange shapes on a grid. In some embodiments, the system uses a Hough transform to find the major grid lines of the image and save these in a data structure (Grid Set). Other methods of finding the grid may also be used. For example, the system may find the corner shapes and interpolate or find distances from every shape to every other shape. The system may also remove the major grid lines which are duplicates from the grid set or interpolate the missing grid lines in the grid set.

In block 1745, the system places shapes on the grid. The system uses the grid set to place the classified shapes (in New Set) onto a grid.

In block 1750, the system returns the results. For example, the system may return just the shape-classified elements from New Set to the calling program. The calling program can use the shape-classified elements to identify the product.

Example 8

Authentication of Code from Both Printed and Digital Sources

Authentication and analysis of code is not limited to printed forms of information. Prior to printing the document can exist in a digital format such as an image format (BMP, JPG, TIF, PNG, and others) or a PDF format. For verification and authentication purposes, the authenticated document can be the original digital file and does not have to be limited to an image of a print of the respective document.

In this example, code fields attached to documents are generated from proprietary software using the methods described in Example 7. These documents are secured and outputted from the system in the form of a PDF. At this point the PDF is verified with and without departing from the scope and spirit being physically printed in proprietary authentication software according to methods described in U.S. Pat. No. 8,220,716 and U.S. Provisional Patent Application No. 61/479,380, the contents of which are hereby incorporated by reference herein. FIGS. 18A, 18B, 18C, and 18D demonstrate a representative example of this embodiment. Therefore, it is to be understood that, within the scope this generation and analysis where FIG. 18A shows a representative encoded document displaying a number on an encoded field. FIG. 18B demonstrates an example visualization of the appended claims, the invention may be practiced resulting analysis and verification of the document. FIG. 18C shows the same encoded field as in 18A but the numeral on the field has been altered. FIG. 18D demonstrates an example visualization of the resulting analysis and verification of the documenting displaying where the information contained within has been changed. TABLE I illustrates formal test repetitions of analysis where both digital and printed forms of the secured document were scanned with identical validation results.

TABLE I

| | Successful Iterations | | | Unsuccessful Iterations | | |
|---|---|---|---|---|---|---|
| Code | Generatio | Validatio | Print | Generatio | Validatio | Print |
| 313113130 | 3 | 3 | 3 | 0 | 0 | 0 |
| 321111110 | 3 | 3 | 3 | 0 | 0 | 0 |
| 113221320 | 3 | 3 | 3 | 0 | 0 | 0 |
| 231321310 | 3 | 3 | 3 | 0 | 0 | 0 |
| 333321110 | 3 | 3 | 3 | 0 | 0 | 0 |

TABLE I-continued

| | Successful Iterations | | | Unsuccessful Iterations | | |
|---|---|---|---|---|---|---|
| Code | Generatio | Validatio | Print | Generatio | Validatio | Print |
| 211312110 | 3 | 3 | 3 | 0 | 0 | 0 |
| 312113110 | 3 | 3 | 3 | 0 | 0 | 0 |
| 223111210 | 3 | 3 | 3 | 0 | 0 | 0 |

Example 9

Using Orientation Marks to Define Valid Orientations of Code

Using the image generation algorithm described in U.S. patent application Ser. No. 13/457,115, code is placed as a background on a document. An exemplary code that includes eight symbol types (i.e., "groups of entities") as illustrated in FIG. 19 is placed onto a document in random positional sequence but at fixed frequencies. The algorithm accepts a set of symbols and desired frequencies of each symbol by type according to the method described in U.S. Pat. No. 7,874,489, incorporated by reference herein, and then outputs a field of code, wherein the field dimension is a user specified parameter. In this example, orientation marks are added to the code field, prior to, simultaneous with, or subsequent to code generation. FIGS. 20A, 20B, 20C, and 20D show a representative example of a code field where the orientation is defined by orientation marks in the top left, top right and bottom left corners. In this case the orientation mark is a contrasting square inset within another square. Any distinct mark may be used in positions that are only valid for one orientation such as: crosses, triangles, circles, corner brackets, etc., and that the selection of any three corners is sufficient to define a unique orientation. FIG. 20A demonstrates the valid orientation of the field while FIGS. 20B, 20C, and 20D demonstrate examples of invalid orientations of the field.

In these one or more embodiments, the methods disclosed herein may compare the orientation marks of the authentication identifier with orientation marks of the true authentication identifier.

Example 10

Using Code Elements with Intrinsic Orientation to Define Valid Orientations of Code FIG. 21 illustrates an example of a symbol with intrinsic orientation. The inclusion of such a character in a symbol set would allow for the orientation of a generated pattern to be only valid in one direction. Other characters with a unique orientation such as an arrow, the letter A, an isosceles triangle, etc. would also provide similar benefit, and that any orientation of the orienting symbol is sufficient to uniquely identify the valid orientation of a field of code.

FIG. 22A, where the code field is generated using the method described in Example 10, contains four representative orientations for a selection of a code field (FIGS. 22A, 22B, 22C, and 22D). However, the validity of orientation of the orienting symbol (shown in FIG. 21) is being used to decide whether or not the code selection is valid. FIG. 22A demonstrates a valid orientation whereas FIGS. 22B, 22C, and 22D demonstrate invalid orientations.

In this example only 90 degree rotations are being drawn, however, any orientation other than as specifically the desired one would create an invalid code and/or code selection.

As described in this example, the one or more reference characters includes one or more reference characters with an intrinsic orientation. The one or more methods disclosed herein may provide for comparing the reference characters with an intrinsic orientation with reference characters of an intrinsic orientation of the true authentication identifier.

The product authentication identifier may define a perimeter thereof that forms an intrinsic shape with a predetermined orientation, and the one or more methods may include comparing the intrinsic shape with a predetermined orientation with an intrinsic shape with a predetermined orientation of the true authentication identifier.

Example 11

Using Text to Define Valid Orientations of Code

FIG. 23 illustrates where text characters are used as the discrete groups of entities that comprise a signature array, as is more fully described in U.S. Pat. No. 7,874,489 and incorporated by reference herein. The parameters varied are text character and text font style. The three characters used are a, b, and c, while the styles are plain, bold and underlined. Other text features that could be used as code variations include but are not limited to: italics, capitalization, fonts, colors, etc. For this example, there are nine possible code elements: a, b, c, a, b, c, a, b, and c. In the following embodiment the code is 1:2:3:3:2:1:1:2:1 for a:b:c:a:b:c:a:b:c, respectively.

In FIGS. 24A, 24B, 24C, and 24D, a signature array is deposited in a code field according to methods described in U.S. Pat. No. 7,874,489. FIG. 24A contains four representative orientations for a selection of code (FIGS. 24A, 24B, 24C, and 24D). However, the validity of orientation of text is being used to decide whether or not the code selection is valid. Because text is only readable in one orientation, this example uses the natural written language orientation of English (natural language text) to orient the code for analysis (FIG. 24A). All other orientations, as exemplified by FIGS. 24B, 24C, and 24D are invalid.

In this example only 90 degree rotations are being drawn, however, any orientation other than the desired one would create an invalid code and/or code selection.

In this example English fonts and the natural written language orientation of English is being used to designate valid orientations, however, characters of other languages with different orientations than English could be used to achieve different valid orientations. Moreover, a string may be defined in the vertical orientation, in contrast to the horizontal orientations discussed above.

As disclosed herein, the one or more methods may be configured to operate where the signature array includes a string of language characters of a defined characteristic, and the one or more methods includes comparing the reference characters with a signature array with the reference characters of a signature array of the true authentication identifier. The orientation of the image may be determined by the one or more methods based on orientation of the reference characters.

Example 12

Using Text Features in a Document to Define Correct Orientation of Code

Here a code field was generated as described herein in Example 9 but in this example, text is placed on top of the code. FIGS. 25A, 25B, 25C, and 25D illustrate the use of text within a document to provide an orientation for the field of code underlying it. As more fully described in Example 11, text has intrinsic orientation so the orientation of text may be used to orient said underlying field. While FIG. 25A shows valid versus invalid orientations shown in FIGS. 25B, 25C, and 25D as a function of rotation at 90 degree intervals, rotations at other angles will also produce invalid orientations.

In one or more embodiments, other symbology with intrinsic orientation such as the symbols listed in Example 4 can be used as overlays to demonstrate valid and invalid orientations.

Example 13

Using a Specific String of Entities to Define Orientation

In this example code fields are generated using the method as described in Example 9. As illustrated in FIGS. 26A, 26B. 26C, and 26D, a predetermined string of entities, which in this example may be symbols, indicate correct orientation. As seen in FIG. 26A the orientation of the subset is only valid when oriented in a certain order and direction such as the one seen in FIG. 21. All other orientations of this subset (FIGS. 26B, 26C, and 26D) are invalid.

The orienting pattern subset is not limited to the one seen in FIGS. 26A, 26B, 26C, and 26D and does not have to have a horizontal orientation. For example, invalid orientations are not limited to 90 degree rotations of the valid orientations but all other orientations aside from the valid one would be considered invalid.

The one or more methods disclosed herein may provide for where the one or more reference characters include a string of characters, and the method includes comparing the string of characters with a string of characters of the true authentication identifier. The string of characters of the true authentication identifier may have a predetermined, approved orientation.

Example 14

Using Absence of Symbols on a Pattern to Establish Orientation

In this example code fields are generated using the method described in Example 9 with the additional feature of after creating the code field, specific portions of the code are removed from or not added in user defined areas to create orientation marks as seen in FIGS. 27A, 27B, 27C, and 27D. This represents an example of a code area where the orientation is defined by symbols missing from the pattern in the top left, top right and bottom left corners. In this case the missing shapes create a 2×2 shape square on each aforementioned corner with the shapes adjacent to the 2×2 square missing. Any distinct pattern resulting from a lack of shapes could be used in positions that are only valid for one orientation such as: crosses, triangles, circles, corner brackets, etc. FIG. 27A demonstrates an example of a valid orientation and FIGS. 27B, 27C, and 27D demonstrate invalid orientations.

In one or more embodiments, the missing shapes do not have to be isolated to the corners of the pattern space but can be placed in any distinct location within the pattern space in any number of combinations that results in unique spatial orientation.

In one or more embodiments, the missing shapes form an orienting pattern that has unique orienting characteristics such as the pattern created by the shape shown in FIG. 21, then one or more missing shape patterns could be used.

Example 15

Using Orientation Marks of Other Elements to Discern Orientation

With this example code fields are generated using the method described in Example 9. After the code field is generated additional text and other information are placed over the code field. The additional information is the object of the security provided by the code field. FIGS. 28A, 28B, 28C, and 28D demonstrate where the existing orientation marks of another element in a field, such as a 2D or 3D barcode, are used to orient a space where code has been underlayered. The 2D barcode is only valid in one orientation (FIG. 28A) which is designated by preset orientation marks specific to the 2D barcode. The code is oriented in the same direction of the 2D barcode and thus utilizes the orientation marks of the 2D barcode as well. FIGS. 28B, 28C, and 28D are examples of invalid orientations. The barcode may be provided onto the image after the product authentication identifier has been provided.

The element used with pre-existing orientation marks is not limited to 2D barcodes but 2D barcodes are just one of many other elements with orienting marks.

Example 16

Using the Orientation of Substrate Media to Determine Correct Orientation

This example demonstrates code fields generated as described in Example 9 where the code field is designed to have an asymmetrical shape. FIG. 29A details the use of the shape of the substrate on which code is placed to discern the proper and valid orientation of code. In the case where the substrate media only has one valid orientation (FIG. 29A) the code orientation is determined to be the same. In this example, only one orientation is valid where all other rotations are invalid (FIGS. 29B, 29C, and 29D).

As long as the shape of the substrate media has a unique orientation then the code can be oriented.

Example 17

Security Pattern of Invalid Orientation does not Authenticate to Correct Code

In this example the code field is generated using the method described in Example 9. The authentication process is carried out by proprietary image processing software which can read and classify the code. FIG. 30A demonstrates how orientation reflects the ability to successfully verify a document in the document security system. FIG. 30A shows an encoded field with a valid orientation. When delivered into the system, FIG. 30B, the system is able to retrieve not only the correct code but also verify the authenticity of the document contents. FIG. 30C demonstrates an invalid orientation of the document and in FIG. 30D the system fails to retrieve the correct authentication code from the document.

Only two orientations have been displayed here, all rotations of the valid orientation would fail aside from the single valid orientation.

Example 18

One Way Authentication of Code Read from a Screen

The reading and verification of codes is not limited to cases where codes inserted into a fixed document either in electronic or physical form and then transferred to a verification entity. The product authentication identifier and other codes can also be read directly off a display of the pertinent file from a screen. The screen can include a personal computer screen, a mobile phone screen, a PDA screen, or any other visual presentation of the file.

In this scenario, a code field was generated as described in Example 9 and displayed on a laptop computer screen. In FIG. 31, an imaging device 310, such as a mobile phone camera, handheld device, camera, or smartphone, can image the code off the screen 312 and then proceed to analyze and retrieve the code. This allows for direct validation of the document without printing.

The imaging device 310 may include memory stored thereon that is configured to execute computer control code commands to control of provide for any of the methods and/or examples disclosed herein. Furthermore, the imaging device 310 may be in communication with a network, such as a wireless or cellular network, that communicates information such as authentication code and validation results through such network to an external server where authentication code or other relevant information is stored.

Example 19

Two Way Authentication of Code Read from a Screen

Although in several cases the code is combined onto a digital and/or physical article and fixed in this position, codes can also be created for short term single use implementations. One such implementation is when there is a desire to authenticate a device via imaging off of the screen of the device. For example creating a secure digital authentication of credentials between a mobile phone 320 and a laptop computer 322 could be accomplished via imaging code off of the screen of each device by the other.

In this scenario, demonstrated in FIG. 32, the mutual authentication, or handshake, between the devices would occur when the laptop computer 322 uses the built in camera to image a code pattern generated by the mobile phone 320 and displayed on its screen. Computer 322 then continues to analyze the image and extract the code. Concurrently or in sequence, demonstrated in FIG. 32, the mobile phone 320 uses its built in camera to image a similar code generated on the screen of 322. Mobile phone 320 then continues to analyze the image from 322 and extract the code. If the codes match then the handshake is successful.

In one or more embodiments, the images can be taken sequentially or concurrently and the processing can be done sequentially or concurrently. Additionally the codes can be used in their literal form or they can be used as a public key to further decrypt secure information. This latter scenario would be similar to the public key of the public key infrastructure (PKI).

Example 20

Authentication of a Document Using a Mobile Imaging Device

The mobile imaging device 310 may be utilized to image a document 330 having an authentication code 332 applied thereon as illustrated in FIG. 33. In this manner, the imaging device 310 may be utilized to scan a single document or multiple documents, and may be used to scan an "upstream" version of a document and a "downstream" version of the document to compare authentication code applied thereon. If the imaging device 310 detects a tampering of the document by alteration of the authentication code, then the imaging device 310 may direct a user that tampering has occurred. The imaging device 310 may have a computer control program code installed thereon for carrying out any of the methods disclosed herein for authenticating a document. And while a document is shown in this illustrative example, any product in which authentication code may be applied thereon may be employed.

The imaging device 310 may communicate over a wireless network as illustrated in FIG. 34. For example, the imaging device 310 may communicate over a cellular or wireless internet or hardwired network, all represented by 340, to a base station 350, which may be a wireless base station such as a cell tower or a wireless router. The base station 350 may then be further configured to communicate over an additional network 360, which is illustrated as the internet in this example. A server 370 may be provided in communication with network 360 and include computer program code thereon that stores information such as the authentication code, the type of product being authenticated, the time of authentication, and information imaged off of the document.

In this manner, computer control code to be executed by the imaging device 310 may be stored in a variety of manners. For example, the computer control code could be stored in the memory of the mobile device 310 and accessed by the mobile device 310 without access to an external network. Information received by the mobile device 310 executing the computer control code could then be transferred to outside storage once in range of a network or through a USB, flash, or similar methodology. The computer control code may include a data bank that stores various authentication codes and methods for authenticating as disclosed in the examples provided herein.

In other embodiments, the computer control code could be stored on the server 370 and transmitted to the imaging device 310 over network 360 or network 340. In this manner, the computer control code is selectively accessed by the imaging device 310 and the contents thereof may be at an increased level of security in this scenario. The imaging device 310 would then access the computer control code by sending a request to the server 370.

Accordingly a system is provided that includes a databank of true product authentication identifiers, with the databank being provided on the imaging device 310, base station 350, or server 370. The imaging device is in communication with the databank and that is configured to image a product authentication identifier and compare the product authentication identifier with a respective true product authentication identifier in the databank. The imaging device 310 is configured to image the product authentication identifiers at multiple times. For example, the imaging device 310 may be configured to image the identifiers and the product or object at upstream and downstream locations and store or convey to the server 370 the images and related information disclosed therein. The imaging device 310 may be a smart phone or mobile device. The imaging device 310 and the databank communicate over one of a wireless and cellular networks 340, 360. A base station 350 may be provided and may be in wireless communication with the mobile device 310 and with the databank of the server 370. The imaging device 310 may include computer control code thereon for imaging the product authentication identifier and comparing the product authentication identifier with a respective true product authentication identifier in the databank. In other embodiments, the databank of the server 370 may include computer control code thereon that is communicated to the imaging device upon request for imaging the product authentication identifier and comparing the product authentication identifier with a respective true product authentication identifier in the databank.

Where possible, any terms expressed in the singular form herein are meant to also include the plural form and vice versa, unless explicitly stated otherwise. Also, as used herein, the term "a" and/or "an" shall mean "one or more," even though the phrase "one or more" is also used herein. Furthermore, when it is said herein that something is "based on" something else, it may be based on one or more other things as well. In other words, unless expressly indicated otherwise, as used herein "based on" means "based at least in part on" or "based at least partially on." It should also be understood that while some embodiments describe the methods or products as including one or more elements, the methods or elements may also consist of or consist essentially of the elements disclosed herein. Furthermore, systems and/or methods described as including one or more elements may also consist of or consist essentially of the elements.

The steps and/or actions of a method described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, a hard disk, a removable disk, a CD-ROM, or any other form of storage medium known in the art. An exemplary storage medium may be coupled to the processor, such that the processor can read information from, and write information to, the storage medium. In the alternative, the storage medium may be integral to the processor. Further, in some embodiments, the processor and the storage medium may reside in an Application Specific Integrated Circuit (ASIC). In the alternative, the processor and the storage medium may reside as discrete components in a computing device. Additionally, in some embodiments, the events and/or actions of a method may reside as one or any combination or set of codes and/or instructions on a machine-readable medium and/or computer-readable medium, which may be incorporated into a computer program product.

In one or more embodiments, the functions described may be implemented in hardware, software, firmware, or any combination thereof. If implemented in software, the functions may be stored or transmitted as one or more instructions or code on a computer-readable medium. Computer-readable media includes both computer storage media and communication media including any medium that facilitates transfer of a computer program from one place to another. A storage medium may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures, and that can be accessed by a computer.

Also, any connection may be termed a computer-readable medium. For example, if software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. "Disk" and "disc", as used herein, include compact disc (CD), laser disc, optical disc, digital versatile disc (DVD), floppy disk and blu-ray disc where disks usually reproduce data magnetically, while discs usually reproduce data optically with lasers. Combinations of the above should also be included within the scope of computer-readable media Computer program code for carrying out operations of embodiments of the present disclosure may be written in an object oriented, scripted or unscripted programming language such as Java, Perl, Smalltalk, C++, or the like. However, the computer program code for carrying out operations of embodiments of the present disclosure may also be written in conventional procedural programming languages, such as the "C" programming language or similar programming languages.

Embodiments of the present disclosure are described herein with reference to flowchart illustrations and/or block diagrams of methods, apparatus (systems), and computer program products. It may be understood that each block of the flowchart illustrations and/or block diagrams, and/or combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create mechanisms for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer readable memory produce an article of manufacture including instruction means which implement the function/act specified in the flowchart and/or block diagram block(s).

The computer program instructions may also be loaded onto a computer or other programmable data processing apparatus to cause a series of operational steps to be performed on the computer or other programmable apparatus to produce a computer-implemented process such that the instructions which execute on the computer or other programmable apparatus provide steps for implementing the functions/acts specified in the flowchart and/or block diagram block(s). Alternatively, computer program implemented steps or acts may be combined with operator or human implemented steps or acts in order to carry out an embodiment of the disclosure.

We claim:
1. A method of determining differences between items of interest, the method comprising:
 receiving an item of interest, wherein the item of interest is associated with a signature;

comparing the item of interest to a set of reference images that comprises a series of reference shapes including at least two distinct, spatially-separated reference shapes in a same plane;

determining a plurality of similarity scores between the item of interest and the set of reference images by comparing the reference images and the item of interest;

determining an error vector based on the plurality of similarity scores; and comparing the determined error vector with an error vector created from an authentic item associated with the signature.

2. A method of calculating the similarity between two or more images, the method comprising:

selecting a set of reference images that comprises a series of reference shapes including at least two distinct, spatially-separated reference shapes in a same plane;

selecting a target image that comprises a series of target shapes including at least two distinct, spatially-separated target shapes in a same plane;

scaling the target image substantially to the set of reference images;

comparing the target image to the set of reference images by comparing the target shapes with the reference shapes;

determining a plurality of similarity scores between the set of reference images and the target image by comparing the reference image and the target image; and determining an error vector based on the plurality of similarity scores.

3. The method of claim 2, wherein the set of reference images are a set of shapes.

4. The method of claim 3, wherein the shapes in the set of shapes are approximately equivalent.

5. The method of claim 3, wherein the shapes are separable relative to one another.

6. The method of claim 3, wherein at least eight different shapes form the set of shapes.

7. The method of claim 3, wherein the shapes are aligned or closely aligned to a particular axis.

8. The method of claim 2, wherein each of the set of reference images and set of target images are compared based on a percentage of the reference image that is occupied by the reference shapes and a percentage of the target image that is occupied by the target shapes.

9. The method of claim 2, wherein the same plane is a flat plane.

* * * * *